United States Patent
Tye et al.

(10) Patent No.: US 10,572,943 B1
(45) Date of Patent: Feb. 25, 2020

(54) MAINTAINING CURRENT INSURANCE INFORMATION AT A MOBILE DEVICE

(71) Applicant: Allstate Insurance Company, Northbrook, IL (US)

(72) Inventors: Roger A. Tye, Chicago, IL (US); Richard J. Desiderio, Jr., Mundelein, IL (US); Laura Fischer-Klein, Buffalo Grove, IL (US); Steven T. Leckman, Buffalo Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 14/022,552

(22) Filed: Sep. 10, 2013

(51) Int. Cl.
*G06Q 40/08* (2012.01)

(52) U.S. Cl.
CPC .................... *G06Q 40/08* (2013.01)

(58) Field of Classification Search
CPC ..................................................... G06Q 40/08
See application file for complete search history.

(56) References Cited

U.S. PATENT DOCUMENTS

| | | | |
|---|---|---|---|
| 4,638,289 A | 1/1987 | Zottnik | |
| 5,450,329 A | 9/1995 | Tanner | |
| 5,742,699 A | 4/1998 | Adkins et al. | |
| 5,950,169 A | 9/1999 | Borghesi et al. | |
| 6,027,415 A | 2/2000 | Takeda | |
| 6,060,989 A | 5/2000 | Gehlot | |
| 6,061,610 A | 5/2000 | Boer | |
| 6,076,028 A | 6/2000 | Donnelly et al. | |
| 6,141,611 A | 10/2000 | Mackey et al. | |
| 6,211,777 B1 | 4/2001 | Greenwood et al. | |
| 6,246,933 B1 | 6/2001 | Bague | |
| 6,262,657 B1 | 7/2001 | Okuda et al. | |

(Continued)

FOREIGN PATENT DOCUMENTS

| | | |
|---|---|---|
| AU | 2002301438 B2 | 9/2006 |
| AU | 2007200869 A1 | 3/2007 |

(Continued)

OTHER PUBLICATIONS

Domanico, A., Geico Releases Insurance Glovebox App for Android, Aug. 10, 2010 (http://androidandme.com/2010/08/applications/geico-releases-insurance-glovebox-app-for-android/).*

(Continued)

*Primary Examiner* — William J Jacob
(74) *Attorney, Agent, or Firm* — Banner & Witcoff, Ltd.

(57) ABSTRACT

Systems and methods are provided for maintaining up-to-date insurance information at a mobile device. In some example embodiments, insurance information associated with an insurance customer is obtained, and an insurance card image is generated based on the insurance information. A connection is established with a mobile device associated with the insurance customer, and the insurance card image is provided to the mobile device. Receipt of the insurance card image at the mobile device causes the mobile device to store the insurance card image. A response is initiated upon determining that the insurance card image was displayed at the mobile device. Telematics information is also analyzed in response to receipt of the message to determine whether to automatically create an insurance claim for the customer.

18 Claims, 8 Drawing Sheets

(56) References Cited

U.S. PATENT DOCUMENTS

| | | |
|---|---|---|
| 6,295,492 B1 | 9/2001 | Lang et al. |
| 6,330,499 B1 | 12/2001 | Chou et al. |
| 6,472,982 B2 | 10/2002 | Eida et al. |
| 6,509,868 B2 | 1/2003 | Flick |
| 6,594,579 B1 | 7/2003 | Lowrey et al. |
| 6,611,740 B2 | 8/2003 | Lowrey et al. |
| 6,641,038 B2 | 11/2003 | Gehlot et al. |
| 6,701,234 B1 | 3/2004 | Vogelsang |
| 6,732,020 B2 | 5/2004 | Yamagishi |
| 6,732,031 B1 | 5/2004 | Lightner et al. |
| 6,741,168 B2 | 5/2004 | Webb et al. |
| 6,762,020 B1 | 7/2004 | Mack et al. |
| 6,765,499 B2 | 7/2004 | Flick |
| 6,798,356 B2 | 9/2004 | Flick |
| 6,909,947 B2 | 6/2005 | Douros et al. |
| 6,925,425 B2 | 8/2005 | Remboski et al. |
| 6,946,966 B2 | 9/2005 | Koenig |
| 6,980,313 B2 * | 12/2005 | Sharif ............... H04N 1/00209 358/1.15 |
| 6,982,654 B2 | 1/2006 | Rau et al. |
| 6,988,033 B1 | 1/2006 | Lowrey et al. |
| 7,069,118 B2 | 6/2006 | Coletrane et al. |
| 7,082,359 B2 | 7/2006 | Breed |
| 7,092,803 B2 | 8/2006 | Kapolka et al. |
| 7,113,127 B1 | 9/2006 | Banet et al. |
| 7,119,669 B2 | 10/2006 | Lundsgaard et al. |
| 7,129,826 B2 | 10/2006 | Nitz et al. |
| 7,133,661 B2 | 11/2006 | Hatae et al. |
| 7,143,290 B1 * | 11/2006 | Ginter .................. G06F 21/10 713/176 |
| 7,155,259 B2 | 12/2006 | Bauchot et al. |
| 7,155,321 B2 | 12/2006 | Bromley et al. |
| 7,174,243 B1 | 2/2007 | Lightner et al. |
| 7,271,716 B2 | 9/2007 | Nou |
| 7,305,293 B2 | 12/2007 | Flick |
| 7,348,895 B2 | 3/2008 | Lagassey |
| 7,477,968 B1 | 1/2009 | Lowrey et al. |
| 7,565,230 B2 | 7/2009 | Gardner et al. |
| 7,671,727 B2 | 3/2010 | Flick |
| 7,715,961 B1 | 5/2010 | Kargupta |
| 7,747,365 B1 | 6/2010 | Lowrey et al. |
| 7,970,834 B2 * | 6/2011 | Daniels ................. H04L 51/34 709/206 |
| 8,000,979 B2 | 8/2011 | Blom |
| 8,014,789 B2 | 9/2011 | Breed |
| 8,019,629 B1 | 9/2011 | Medina, III et al. |
| 8,041,635 B1 | 10/2011 | Garcia et al. |
| 8,069,060 B2 | 11/2011 | Tipirneni |
| 8,090,598 B2 | 1/2012 | Bauer et al. |
| 8,140,358 B1 | 3/2012 | Ling et al. |
| 8,214,100 B2 | 7/2012 | Lowrey et al. |
| 8,229,759 B2 | 7/2012 | Zhu |
| 8,260,639 B1 | 9/2012 | Medina, III et al. |
| 8,271,187 B2 | 9/2012 | Taylor et al. |
| 8,285,588 B2 | 10/2012 | Postrel |
| 8,311,858 B2 | 11/2012 | Everett et al. |
| 8,321,086 B2 | 11/2012 | Park et al. |
| 8,330,593 B2 | 12/2012 | Golenski |
| 8,370,254 B1 * | 2/2013 | Hopkins, III .......... G06Q 40/08 705/39 |
| 8,401,877 B2 | 3/2013 | Salvagio |
| 8,403,225 B2 | 3/2013 | Sharra et al. |
| 8,417,604 B2 | 4/2013 | Orr et al. |
| 8,423,239 B2 | 4/2013 | Blumer et al. |
| 8,432,262 B2 | 4/2013 | Talty et al. |
| 8,433,590 B2 | 4/2013 | Prescott |
| 8,438,049 B2 | 5/2013 | Ranicar et al. |
| 8,442,508 B2 | 5/2013 | Harter et al. |
| 8,447,459 B2 | 5/2013 | Lowrey et al. |
| 8,452,486 B2 | 5/2013 | Banet et al. |
| 8,463,488 B1 | 6/2013 | Hart |
| 8,466,781 B2 | 6/2013 | Miller et al. |
| 8,478,514 B2 | 7/2013 | Kargupta |
| 8,484,113 B2 | 7/2013 | Collopy et al. |
| 8,494,938 B1 * | 7/2013 | Kazenas ................ G06Q 40/08 705/35 |
| 8,510,200 B2 | 8/2013 | Pearlman et al. |
| 8,527,135 B2 | 9/2013 | Lowrey et al. |
| 8,547,435 B2 | 10/2013 | Mimar |
| 8,571,895 B1 | 10/2013 | Medina, III et al. |
| 8,577,703 B2 | 11/2013 | McClellan et al. |
| 8,595,034 B2 | 11/2013 | Bauer et al. |
| 8,598,977 B2 | 12/2013 | Maalouf et al. |
| 8,620,692 B2 | 12/2013 | Collopy et al. |
| 8,630,768 B2 | 1/2014 | McClellan et al. |
| 8,633,985 B2 | 1/2014 | Haynes et al. |
| 8,635,091 B2 | 1/2014 | Amigo et al. |
| 8,645,014 B1 * | 2/2014 | Kozlowski ............. H04W 4/70 701/24 |
| 8,799,034 B1 | 8/2014 | Brandmaier et al. |
| 8,903,852 B1 * | 12/2014 | Pedregal ........... G06F 17/30864 707/707 |
| 8,935,036 B1 | 1/2015 | Christensen et al. |
| 9,325,807 B1 * | 4/2016 | Meoli .................... H04L 67/42 |
| 2002/0063637 A1 | 5/2002 | Eida et al. |
| 2002/0111725 A1 | 8/2002 | Burge |
| 2002/0135679 A1 | 9/2002 | Scaman |
| 2003/0212567 A1 | 11/2003 | Shintani et al. |
| 2003/0233261 A1 | 12/2003 | Kawahara et al. |
| 2004/0083123 A1 | 4/2004 | Kim et al. |
| 2004/0088090 A1 | 5/2004 | Wee |
| 2004/0186744 A1 | 9/2004 | Lux |
| 2004/0189493 A1 | 9/2004 | Estus et al. |
| 2004/0205622 A1 | 10/2004 | Jones et al. |
| 2005/0021374 A1 | 1/2005 | Allahyari |
| 2005/0161505 A1 | 7/2005 | Yin et al. |
| 2005/0216487 A1 * | 9/2005 | Fisher .................... G06Q 10/06 |
| 2005/0278082 A1 | 12/2005 | Weekes |
| 2006/0224305 A1 | 10/2006 | Ansari et al. |
| 2006/0226960 A1 | 10/2006 | Pisz et al. |
| 2007/0009136 A1 | 1/2007 | Pawlenko et al. |
| 2007/0043594 A1 | 2/2007 | Lavergne |
| 2007/0136162 A1 | 6/2007 | Thibodeau et al. |
| 2007/0162308 A1 | 7/2007 | Peters |
| 2007/0288268 A1 * | 12/2007 | Weeks .................. G16H 10/60 705/3 |
| 2008/0027761 A1 | 1/2008 | Bracha |
| 2008/0242261 A1 | 10/2008 | Shimanuki et al. |
| 2008/0294690 A1 | 11/2008 | McClellan et al. |
| 2009/0106052 A1 | 4/2009 | Moldovan |
| 2009/0156243 A1 * | 6/2009 | Lichtenfeld ............ G06Q 10/10 455/466 |
| 2009/0164504 A1 | 6/2009 | Flake et al. |
| 2009/0198772 A1 * | 8/2009 | Kim .................... H04L 67/1095 709/203 |
| 2009/0254241 A1 | 10/2009 | Basir |
| 2009/0265385 A1 | 10/2009 | Beland et al. |
| 2010/0030540 A1 | 2/2010 | Choi et al. |
| 2010/0030586 A1 * | 2/2010 | Taylor .................... G06Q 30/02 705/4 |
| 2010/0131300 A1 | 5/2010 | Collopy et al. |
| 2010/0138242 A1 | 6/2010 | Ferrick et al. |
| 2010/0161491 A1 | 6/2010 | Bauchot et al. |
| 2010/0174564 A1 * | 7/2010 | Stender ................. G06Q 40/08 705/4 |
| 2011/0015946 A1 * | 1/2011 | Buckowsky ........... G06Q 40/08 705/3 |
| 2011/0070834 A1 | 3/2011 | Griffin et al. |
| 2011/0077028 A1 | 3/2011 | Wilkes, III et al. |
| 2011/0112870 A1 | 5/2011 | Berg et al. |
| 2011/0153369 A1 | 6/2011 | Feldman et al. |
| 2011/0161116 A1 | 6/2011 | Peak et al. |
| 2011/0161118 A1 | 6/2011 | Borden et al. |
| 2011/0185178 A1 | 7/2011 | Gotthardt |
| 2011/0213628 A1 | 9/2011 | Peak et al. |
| 2011/0281564 A1 | 11/2011 | Armitage et al. |
| 2011/0307188 A1 | 12/2011 | Peng et al. |
| 2012/0028680 A1 | 2/2012 | Breed |
| 2012/0047203 A1 * | 2/2012 | Brown ................... G06Q 30/02 709/203 |
| 2012/0072243 A1 | 3/2012 | Collins et al. |
| 2012/0076437 A1 | 3/2012 | King |

(56) References Cited

U.S. PATENT DOCUMENTS

| | | |
|---|---|---|
| 2012/0084179 A1 | 4/2012 | McRae et al. |
| 2012/0109690 A1* | 5/2012 | Weinrauch ............ G06Q 10/10 705/4 |
| 2012/0109692 A1 | 5/2012 | Collins et al. |
| 2012/0119936 A1 | 5/2012 | Miller et al. |
| 2012/0136802 A1 | 5/2012 | McQuade et al. |
| 2012/0150412 A1 | 6/2012 | Yoon et al. |
| 2012/0191476 A1 | 7/2012 | Reid et al. |
| 2012/0197486 A1 | 8/2012 | Elliott |
| 2012/0197669 A1 | 8/2012 | Kote et al. |
| 2012/0209631 A1 | 8/2012 | Roscoe et al. |
| 2012/0209632 A1 | 8/2012 | Kaminski et al. |
| 2012/0230548 A1 | 9/2012 | Calman et al. |
| 2012/0232995 A1 | 9/2012 | Castro et al. |
| 2012/0239417 A1* | 9/2012 | Pourfallah ............ G06Q 50/22 705/2 |
| 2012/0242503 A1 | 9/2012 | Thomas et al. |
| 2012/0250938 A1 | 10/2012 | DeHart |
| 2012/0259665 A1 | 10/2012 | Pandhi et al. |
| 2012/0290150 A1 | 11/2012 | Doughty et al. |
| 2012/0303392 A1 | 11/2012 | Depura et al. |
| 2012/0316893 A1 | 12/2012 | Egawa |
| 2012/0330687 A1 | 12/2012 | Hilario et al. |
| 2013/0006674 A1 | 1/2013 | Bowne et al. |
| 2013/0006675 A1 | 1/2013 | Bowne et al. |
| 2013/0018676 A1 | 1/2013 | Fischer et al. |
| 2013/0030642 A1 | 1/2013 | Bradley et al. |
| 2013/0033386 A1 | 2/2013 | Zlojutro |
| 2013/0035964 A1 | 2/2013 | Roscoe et al. |
| 2013/0046510 A1 | 2/2013 | Bowne et al. |
| 2013/0054274 A1 | 2/2013 | Katyal |
| 2013/0073318 A1 | 3/2013 | Feldman et al. |
| 2013/0073321 A1 | 3/2013 | Hofmann et al. |
| 2013/0138267 A1 | 5/2013 | Hignite et al. |
| 2013/0151288 A1 | 6/2013 | Bowne et al. |
| 2013/0166098 A1 | 6/2013 | Lavie et al. |
| 2013/0166326 A1 | 6/2013 | Lavie et al. |
| 2013/0179027 A1 | 7/2013 | Mitchell |
| 2013/0179198 A1 | 7/2013 | Bowne et al. |
| 2013/0190967 A1 | 7/2013 | Hassib et al. |
| 2013/0197945 A1* | 8/2013 | Anderson ............ G06Q 40/08 705/4 |
| 2013/0204645 A1* | 8/2013 | Lehman ............ G06Q 40/08 705/4 |
| 2013/0211660 A1 | 8/2013 | Mitchell |
| 2013/0226397 A1 | 8/2013 | Kuphal et al. |
| 2013/0289819 A1 | 10/2013 | Hassib et al. |
| 2013/0290036 A1* | 10/2013 | Strange ............ G06Q 40/08 705/4 |
| 2013/0297353 A1* | 11/2013 | Strange ............ G06Q 40/08 705/4 |
| 2013/0297418 A1 | 11/2013 | Collopy et al. |
| 2013/0300552 A1 | 11/2013 | Chang |
| 2013/0304517 A1 | 11/2013 | Florence |
| 2013/0311209 A1 | 11/2013 | Kaminski et al. |
| 2013/0316310 A1 | 11/2013 | Musicant et al. |
| 2013/0317860 A1* | 11/2013 | Schumann, Jr. ....... G06Q 40/08 705/4 |
| 2013/0339062 A1* | 12/2013 | Brewer ............ G06Q 40/08 705/4 |
| 2014/0039934 A1* | 2/2014 | Rivera ............ G06Q 40/08 705/4 |
| 2014/0039935 A1 | 2/2014 | Rivera |
| 2014/0100889 A1 | 4/2014 | Tofte |
| 2014/0111542 A1* | 4/2014 | Wan ............ G06F 17/30253 345/633 |
| 2014/0197939 A1 | 7/2014 | Stefan et al. |
| 2014/0200924 A1 | 7/2014 | Gilbert et al. |
| 2014/0200929 A1 | 7/2014 | Fitzgerald et al. |
| 2014/0244312 A1 | 8/2014 | Gray et al. |
| 2015/0058045 A1 | 2/2015 | Santora |
| 2015/0127570 A1 | 5/2015 | Doughty et al. |

FOREIGN PATENT DOCUMENTS

| | | |
|---|---|---|
| CA | 2658219 A1 | 1/2008 |
| DE | 102010001006 A1 | 7/2011 |
| EP | 1826734 A1 | 8/2007 |
| EP | 1965361 A2 | 9/2008 |
| EP | 2481037 A1 | 8/2012 |
| GB | 2486384 A | 6/2012 |
| GB | 2488956 A | 9/2012 |
| KR | 20020067246 A | 8/2002 |
| WO | 2002079934 A2 | 10/2002 |
| WO | 2012045128 A1 | 4/2012 |
| WO | 2012067640 A1 | 5/2012 |
| WO | 2012097441 A1 | 7/2012 |
| WO | 2012106878 A1 | 8/2012 |
| WO | 2012173655 A1 | 12/2012 |
| WO | 2012174590 A1 | 12/2012 |

OTHER PUBLICATIONS

"Privacy Policy." Lemon Wallet. Retrieved from <http://lemon.com/privacy> on May 20, 2013.

"Design and implementation of a smart card based healthcare information system." Computer Methods and Programs in Biomedicine 81. pp. 66-78. Sep. 27, 2003.

"Information-Sharing in Out-of-Hospital Disaster Response: The Future Role of Information Technology." Abstracts of Prehospital and Disaster Medicine. Retrieved from <http://journals.cambridge.org/action/displayAbstract?fromPage=online&aid=8231246> on May 20, 2013.

"Insurance Tech Trends 2013." Deloitte. 2013.

"Trends 2013—North American Insurance eBusiness and Channel Strategy." Forrester. May 16, 2013.

"Top 10 Technolgy Trends Impacting Life and PC Insurers in 2013." Gartner. Mar. 27, 2013.

"The Automated Collision Notification System." NHTSA. Retrieved from <http://www.nhtsa.gov/DOT/NHTSA/NRD/Articles/EDR/PDF/Research/Automated_Collision_Notification_System.pdf>on Nov. 12, 2013.

"ACN Field Operational Test—Final Report." NHTSA. Oct. 31, 2000.

"ACN Field Operational Test—Evaluation Report." NHTSA. Feb. 2001.

"Automatic Crash Notification." ComCARE Alliance. Retrieved from <http://www.nhtsa.gov/DOT/NHTSA/NRD/Articles/EDR/PDF/Research/ComCARE_ACN_System.pdf> on Nov. 12, 2013.

"GEICO App—Android Apps on Google Play." Retreived from <https://play.google.com/store/apps/details?id=com.geico.mobile&hl=en> on Nov. 12, 2013.

"A study of US crash statistics from automated crash notification data." 20th International Technical Conference on the Enhanced Safety of Vehicles Conference (ESV). Lyon, France, pp. 18-21. 2007.

"Automatic Crash Response, Car Safety, & Emergency Services—OnStar" retrieved from https://www.onstar.com/web/portal/emergencyexplore?tab=g=1 on Jan. 12, 2013.

"Design and Development of a GSM Based Vehicle Theft Control System and Accident Detection by Wireless Sensor Network." International Journal of Emerging Trends in Engineering and Development, Issue 2, vol. 5, pp. 529-540. Jul. 2012.

"Mercedes-Benz mbrace." Oct. 22, 2010.

"The Potential for Automatic Crash Notification Systems to Reduce Road Fatalities." Annals of Advances in Automotive Medicine, vol. 52, pp. 85-92. 2008. (retrieved from http://www.ncbi.nlm.nih.gov/pmc/articles/PMC3256762/ on Jan. 12, 2013).

"This App Turns Smartphones Into Safe Driving Tools." Mashable. Aug. 30, 2012. Retrieved from http://mashable.com/2012/08/30/drivescribe-app-safe-driving on Nov. 12, 2013.

"Using Smartphones to Detect Car Accidents and Provide Situational Awareness to Emergency Responders." Mobile Wireless Middleware, Operating Systems, and Applications, pp. 29-42. Jul. 2010.

(56) References Cited

OTHER PUBLICATIONS

Maciag, A. K. (1980). Motor accident insurance and systems of compensation. (Order No. MK49023, University of Alberta (Canada)). ProQuest Dissertations and Theses, 1. Retrieved from http://search.proquest.com/docview/303097892?accountid=14753. (303097892).
Spevacek, C. E., Ledwith, J. F., Newman, T. R., & Lennes, John B., Jr. (2001). Additional insured and indemnification issues affecting the insurance industry, coverage counsel, and defense counsel—legal advice and practice pointers. FDCC Quarterly, 52(1), 3-101. Retrieved from http://search.proquest.com/docview/201215466?accountid=14753.
"For insurance companies, the day of digital reckoning." Bain & Company. 2013.
"New Idea: QR Codes For License Plates." Feb. 11, 2011. Retrieved from http://www.andrewcmaxwell.com/2011/02/new-idea-qr-codes-for-license-plates on May 21, 2013.
"QR Code." IDL Services. Retrieved from http://www.internationaler-fuehrerschein.com/en/the-idd/qr-code-quick-response-code-feature-in-the-idd.html on May 21, 2013.
"Vehicle Wrap Trends: What are QR Codes and why do I need one?" The Brandtastic Branding & Marketing Education Blog. Retrieved from http://www.sunrisesigns.com/our-blog/bid/34661/Vehicle-Wrap-Trends-What-are-QR-Codes-and-why-do-I-need-one on May 21, 2013.
"Near Field Communication: A Simple Exchange of Information." Samsung. Mar. 5, 2013. Retrieved from http://www.samsung.com/us/article/near-field-communication-a-simple-exchange-of-information on May 21, 2013.
"Microsoft Tag Implementation Guide." Aug. 2010.
"New Technology Security Risks : QR codes and Near Field Communication." Retrieved from http://www.qwiktag.com/index.php/knowledge-base/150-technology-security-risks-qr-codes on Nov. 13, 2013.
"Encrypted QR Codes." qrworld. Nov. 11, 2011. Retrieved from http://qrworld.wordpress.com/2011/11/27/encrypted-qr-codes on Nov. 12, 2013.
"Fraunhofer offers secure NFC keys that can be shared via QR codes." NFC World. Mar. 20, 2013. Retrieved from http://www.nfcworld.com/2013/03/20/323184/fraunhofer-offers-secure-nfc-keys-that-can-be-shared-via-qr-codes on Nov. 13, 2013.
"Automatic License Plate Recognition (ALPR) Scanning Systems." Retrieved from http://www.experiencedcriminallawyers.com/articles/automatic-license-plate-recognition-alpr-scanning-systems on Jun. 28, 2013.
"License plate readers allow police to quickly scan, check for offenders." Mar. 17, 2013. Retrieved from http://cjonline.com/news/2013-03-17/license-plate-readers-allow-police-quickly-scan-check-offenders on Jun. 28, 2013.
"Scan Someone's License Plate and Message Them Instantly with New Bump App." Sep. 17, 2010. Retrieved from http://www.popsci.com/cars/article/2010-09/social-networking-site-uses-license-plates-connect-drivers on Jun. 28, 2013.
"License Plate Scanner Obsoletes Meter Maid." Feb. 1, 2011. Retrieved from http://www.thetruthaboutcars.com/2011/02/license-plate-scanner-obsoletes-meter-maid on Jun. 28, 2013.
"Car insurance firms revving up mobile app features." Feb. 2, 2012. Retrieved from http://www.insurance.com/auto-insurance/auto-insurance-basics/car-insurance-mobile-apps.html on Jun. 28, 2013.
"Bump (application)." Retrieved from http://en.wikipedia.org/wiki/Bump_(application) on Aug. 29, 2013.
Domanico, A., Geico Releases Insurance Glovebox App for Android, Aug. 10, 2010. Retrieved from [http://androidandme.com/2010/08/applications/ geico-releases-insurance-glovebox-app-for-android/].
May 23, 2018—U.S. Notice of Allowance—U.S. Appl. No. 14/313,052.
Jul. 5, 2018—U.S. Non-Final Office Action—U.S. Appl. No. 15/235,213.
Aug. 2, 2018—U.S. Non-Final Office Action—U.S. Appl. No. 14/039,722.
Nov. 30, 2018—U.S. Notice of Allowance—U.S. Appl. No. 15/235,213.
Apr. 11, 2017—U.S. Non-Final Office Action—U.S. Appl. No. 14/313,753.
Jun. 29, 2017—U.S. Non-Final Office Action—U.S. Appl. No. 14/039,722.
"Mercedes-Benz mbrace: Safety & Security Services", Rev. Apr. 9, 2012, Mercedes-Benz, <https://www.mbusa.com/vcm/MB/DigitalAssets/pdfmb/mbrace_Cut_Sheet_All_4_12_12_.pdf>, 37 pages.
Freeman, Shanna, "How OnStar Works", Feb. 8, 2006, HowStuffWorks.com, <http://auto.howstuffworks.com/onstar.htm>, 12 pages.
"GenieCam", on AngelList by Selka Inc. w/GenieCam website excerpt, Dec. 11, 2012, AngelList <https://angel.co/geniecam>, 6 pages.
"ATX Launches Enhanced Automatic Collision Notification for BMW", TMC News, Jan. 11, 2009, <http://www.tmcnet.com/2009/01/11/3905139.htm>, 2 pages.
Aug. 10, 2017—U.S. Office Action—U.S. Appl. No. 14/688,611.
Sep. 7, 2017—U.S. Notice of Allowance—U.S. Appl. No. 14/313,052.
Nov. 17, 2017—U.S. Notice of Allowance—U.S. Appl. No. 14/313,753.
Jeevagan et al, RFID Based Vehicle Identification During Collisions, R.V. College of Engineering, Dept. of Instrumentation Technology, Bangalore, Karnataka, India, IEEE Global Humanitarian Technology Conference (GHTC), Downloaded from Google/Scholar, Nov. 13, 2017.
Harding, S.J. (2002), The "Alva Cape" and the Automatic Identification System: The Use of VHF in Collision Avoidance at Sea, The Journal of Navigation, 55(3), pp. 431-442.
Dec. 7, 2012—U.S. Final Office Action—U.S. Appl. No. 14/039,722.
Dec. 28, 2017—U.S. Final Office Action—U.S. Appl. No. 14/688,611.
Feb. 9, 2018—U.S. Notice of Allowance—U.S. Appl. No. 14/313,052.
Mar. 9, 2018—U.S. Notice of Allowance—U.S. Appl. No. 14/313,753.
Nov. 16, 2018—U.S. Non-Final Office Action—U.S. Appl. No. 14/688,611.
Apr. 26, 2019—U.S. Notice of Allowance—U.S. Appl. No. 14/688,611.
Apr. 26, 2019—U.S. Final Office Action—U.S. Appl. No. 14/039,722.

\* cited by examiner

MAINTAINING CURRENT INSURANCE INFORMATION AT A MOBILE DEVICE

TECHNICAL FIELD

Aspects of the present disclosure generally relate to accessing insurance information and more particularly to maintaining current insurance information at a mobile device.

BACKGROUND

Traditionally, a driver keeps a hardcopy of an insurance card in a vehicle, e.g., often in the glove compartment. When a driver renews or updates an insurance policy, an insurance company will typically send the driver a new hardcopy of the insurance card. When the driver receives the new insurance card, the driver may replace the old insurance card in the vehicle with the new insurance card.

The insurance card may include information identifying the insurance company providing the insurance coverage and contact information for the insurance company; the drivers insured under the insurance policy and contact information for the drivers; a vehicle insured under the insurance policy and the color, make, model, and year of the vehicle; effective dates; and other types of insurance information.

Hardcopy insurance cards are associated with a number of disadvantages. A driver may misplace a hardcopy insurance card or forget to place the hardcopy insurance card in the vehicle. An insurance company must continually replace hardcopy insurance cards as insurance policies are renewed and insurance information changes. Moreover, an insurance company is not able to determine when a driver accesses the hardcopy insurance card, e.g., following a vehicle collision. Instead, the driver may initiate contact with the insurance company when insurance services are needed.

Therefore, a need exists for an improved approach to providing insurance information that makes receipt and display of insurance information more efficient for drivers and that allows an insurance company to proactively provide insurance services when customers access their insurance information.

SUMMARY

The following presents a simplified summary in order to provide a basic understanding of some aspects of the disclosure. The summary is not an extensive overview of the disclosure and is not intended to identify key or critical elements or to delineate the scope of protection sought. The following summary merely presents some concepts of the disclosure in a simplified form as an introduction to the more detailed description provided below.

A first aspect described herein provides a method of maintaining up-to-date insurance information at a mobile device. Insurance information associated with an insurance customer may be obtained, and an insurance card image may be generated based on the insurance information. A connection may be established with a mobile device associated with the insurance customer, and the insurance card image may be provided to the mobile device. Receipt of the insurance card image at the mobile device may cause the mobile device to store the insurance card image. A response may be initiated upon determining that the insurance card image was displayed at the mobile device.

A second aspect described herein provides an apparatus for maintaining up-to-date insurance information at a mobile device. The apparatus may include at least one processor and a data store that stores insurance information associated with an insurance customer. An image generator may generate an insurance card image based on the insurance information. A distributor may provide the insurance card image to a mobile device associated with the insurance customer. Receipt of a message from the mobile device that the insurance card image was displayed at the mobile device may cause the apparatus to initiate a response.

A third aspect described herein provides non-transitory computer-readable media for maintaining up-to-date insurance information at a mobile device. The mobile device may receive an insurance card image from an insurance system and store the insurance card image at a data store. In response to receipt of a request to view the insurance card image, the insurance card image may be presented at a display of the mobile device. A message may also be transmitted to an insurance system in response to presenting the insurance card image at the mobile device for display. The message may indicate the date, time, and geographic location at which the insurance card image was displayed.

The mobile device may request the insurance card image from the insurance system or the insurance system may push the insurance card image to the mobile device. A new insurance card image may be created based on new insurance information associated with the insurance customer, and the new insurance card image may be provided to the mobile device. The mobile device may replace a current insurance card image stored at the mobile device with the new insurance card image. A record corresponding to the message indicating that the insurance card image was displayed at the mobile device may also be created.

An insurance display analyzer may compare insurance display information included in respective messages received from the mobile devices associated with insurance customers. A determination of whether to associate the insurance customers with one another may be made based on the comparison of insurance display information. If the insurance display information substantially matches, then the insurance customers may be associated with one another.

Telematics information may also be received from respective vehicles associated with the insurance customers. A telematics analyzer may determine whether a telematics event involving a vehicle has occurred. If so, the insurance display analyzer may compare insurance display information to telematics information to determine whether an insurance card image was displayed in response to the telematics event. If so, an insurance claim may be automatically created and associated with the insurance customer. The telematics analyzer may also determine whether to associate another insurance customer with the insurance claim based on a comparison of telematics information. An additional insurance customer may be associated with the insurance claim when the telematics information received from the vehicle associated with the additional insurance customer substantially matches telematics information received from a vehicle associated with another insurance customer.

Questions may also be provided to the mobile device in response to receipt of a message indicating that the insurance card image was displayed at the mobile device. Answers to the questions may be received and provided to an insurance agent. The insurance agent may also be notified in response to receipt of a message indicating that the insurance card image was displayed at the mobile device.

A non-transitory computer-readable medium having computer-executable instructions stored thereon that carry out one or more of the steps described above is further provided. As used in this disclosure non-transitory computer-readable media include all types of computer-readable media with the sole exception of a transitory propagating signal.

The details of these and other embodiments of the disclosure are set forth in the accompanying drawings and description below. Other features and advantages of aspects of the disclosure will be apparent from the description and drawings.

DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated that one or more components illustrated in the accompanying figures may be positioned in other than the disclosed arrangement and that one or more of the components illustrated may be optional.

DETAILED DESCRIPTION

Aspects of the present disclosure are directed towards various approaches of providing insurance information at a mobile device of a user. In particular, example implementations provide an image of an insurance card having up-to-date insurance information at the mobile device of a user. In some example implementations, the insurance card image may be persistently stored at the mobile device such that the user may access the insurance card image when a network connection is unavailable. In other example implementations, the insurance card image may be provided to the mobile device on demand in response to a request for the insurance card image. When the insurance information of the user is updated, a new insurance card image may be created having the updated insurance information and pushed to the mobile device. In this way, insurance customers may advantageously have access to their insurance information whenever it is needed. Additionally, having an electronic copy of an insurance card available on a mobile device may be more convenient for insurance customers compared to leaving a hardcopy of the insurance card in a vehicle.

Additional aspects of the present disclosure are directed towards following-up with insurance customers in response to a determination that the insurance customer accessed or requested their respective insurance card images. An insurance customer may request or access the insurance card image due to involvement in an insurance-related incident such as, e.g., a vehicle collision. Upon determining that an insurance customer accessed or requested the insurance card image, the insurance company may proactively contact the insurance customer to determine whether the insurance customer needs any insurance-related services such as, e.g., filing an insurance claim. As described in further detail below, the insurance company may identify additional parties involved in the incident based on insurance card access or requests and, additionally or alternatively, an analysis of vehicle telematics data received from the vehicle of the insurance customers. As used in this disclosure, an insurance-related incident refers to an event that may result in the filing of an insurance claim with an insurance company. An incident may involve one or more parties that may or may not be customers of the insurance company. For example some of the parties may be customers of one insurance company while other parties may be customers of another insurance company (e.g., a third-party insurance company). These and other aspects will be appreciated with the benefit of the more detailed description provided below.

Figure 1:
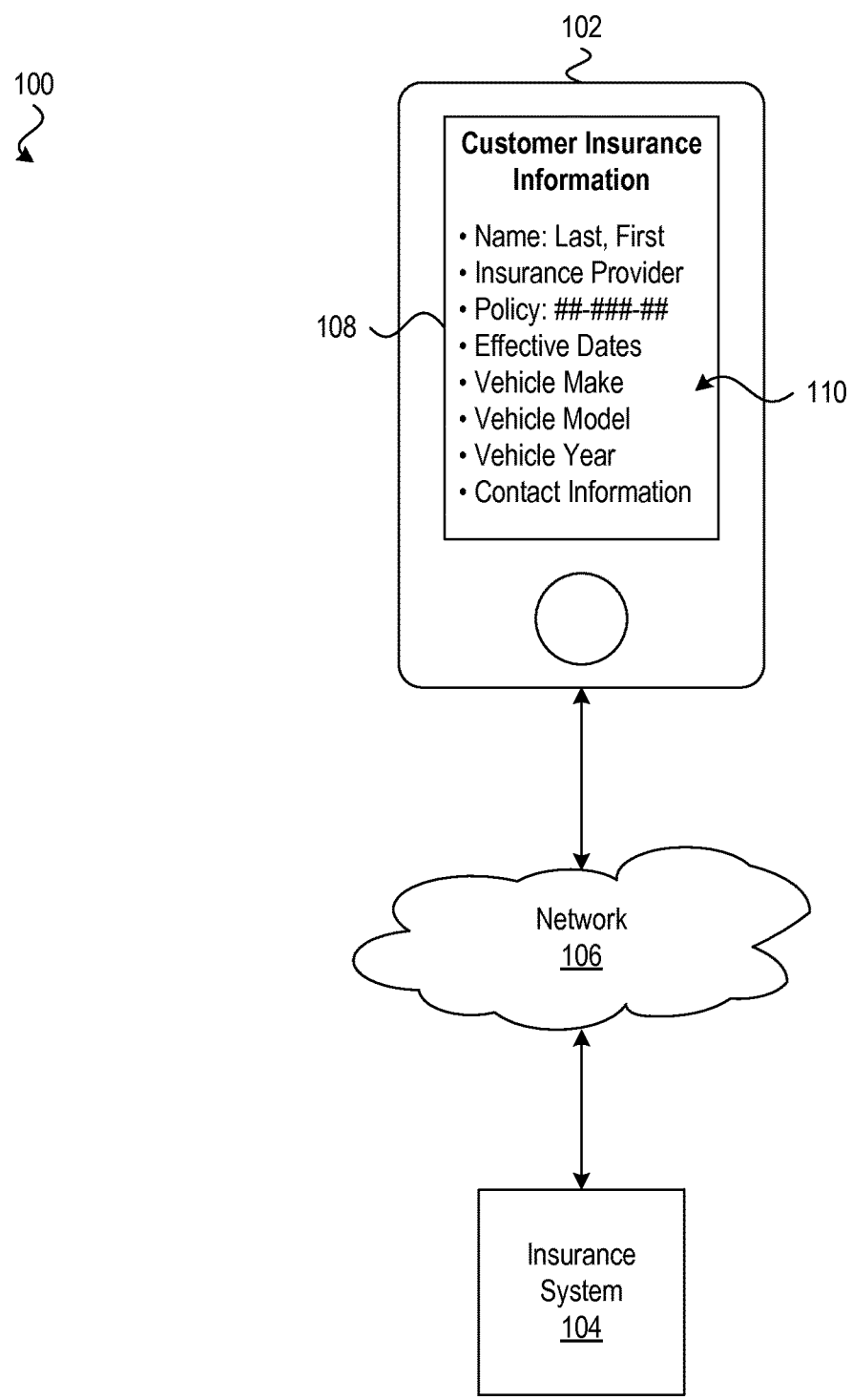
FIG. 1 is an example of an implementation of a system for maintaining current insurance information at a mobile device.

Referring to FIG. 1, an example of an implementation of a system 100 for maintaining current insurance information at a mobile device 102 is shown. As seen in FIG. 1, the mobile device 102 may be in signal communication with an insurance system 104 via a network 106. The mobile device 102 may be, e.g., a mobile telephone, a personal digital assistant (PDA), a palmtop computer, a tablet computer, and other types of mobile computing devices configurable to exchange communications via a communication network. It will be appreciated that the insurance system 104 may provide an insurance card image to other types of computing devices (such as desktop computers) that are also in signal communication with the insurance system via the network 106. The network 106 may be a wireless network such as a cellular network, a wired network such as the Internet, or a combination of a wired or wireless network.

The insurance system 104 may maintain and store insurance information for a user (e.g., the insurance customer) associated with the mobile device 102. The insurance system 104 may generate an insurance card image and provide the insurance card image to the mobile device 102. In response to receipt of the insurance card image, the mobile device 102 may store the insurance card image in persistent or temporary storage. The insurance system 104 may also store the insurance card image to provide to the mobile device in response to receipt of a request from the mobile device. When an insurance customer receives new insurance information, the insurance system 104 may generate a new insurance card image and replace the current insurance card image stored at the insurance system with the new insurance card image. The insurance system may also push the new insurance card image to the mobile device 102. In response to receipt of the new insurance card image, the mobile device 102 may replace the current insurance card image stored at the mobile device with the new insurance card image received from the insurance system 104. It will be appreciated that the insurance system 104 may provide an image corresponding to the front of the insurance card as well as an image corresponding to the back of the insurance card. In this regard, the mobile device 102 may store at least one insurance card image containing at least some insurance information associated with an insurance customer.

As seen in FIG. 1, the mobile device 102 may include a display 108 for presenting the insurance card image 110 to the user. As shown by way of example in FIG. 1, the insurance card image may include the insurance information for the insurance customer including, e.g., the first and last name of the insurance customer; the name of the insurance provider; the policy number for the insurance policy of the insurance customer; the effective dates of the insurance policy; the make, model, and year of the vehicle insured under the insurance policy; and the contact information for the insurance customer such as a mailing address, phone number, and email address. It will be appreciated that the insurance card image may include additional or alternative types of insurance information. It will thus be appreciated that the system 100 advantageously enables insurance customers to access and display their insurance information on demand whenever it is needed such as, e.g., retrieving an insurance policy expiration date after being involved in a vehicle incident or during a traffic stop. It will be appreciated that providing an electronic copy of an insurance card image may be advantageous in other contexts beyond involvement in traffic incidents. For example, the electronic copy of the insurance card provides a convenient way to retrieve insurance information when an insurance customer is not at the vehicle, e.g., when the insurance customer renews or updates an insurance policy.

Figure 2:
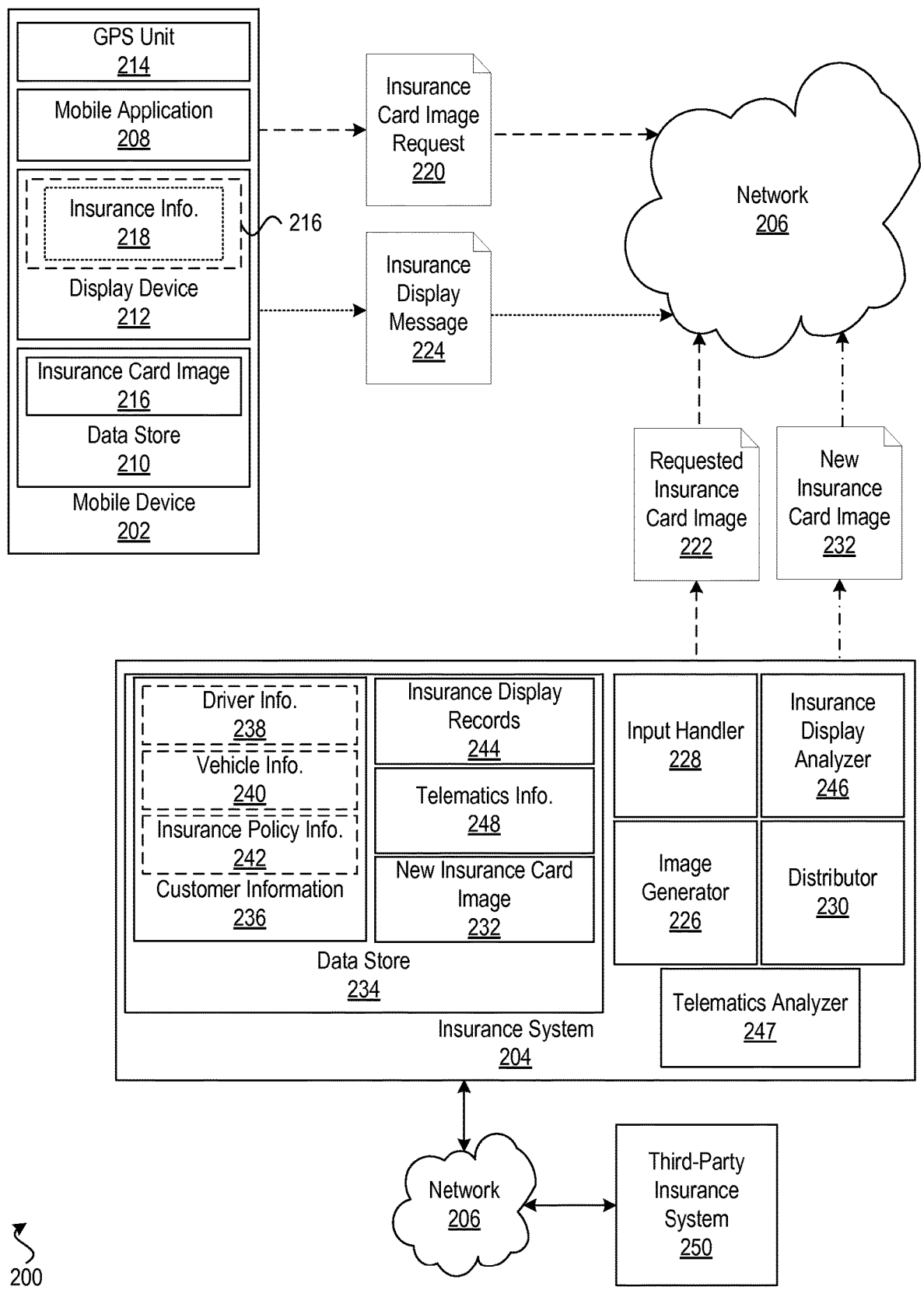
FIG. 2 is a block diagram of an example of an implementation of a system for maintaining current insurance information at a mobile device.

Referring now to FIG. 2, a block diagram of an example of an implementation of a system 200 for maintaining current insurance information at a mobile device 202 is shown. As described above, the mobile device 202 may be in signal communication with an insurance system 204 via a network 206. The mobile device 202, in this example, includes a mobile application 208, a data store 210, a display device 212, and a Global Positioning System (GPS) unit 214.

The data store 210 of the mobile device 202 may store the insurance card image 216 having the insurance information 218 for the insurance customer associated with the mobile device. The data store 210 may store the insurance card image 216 persistently or temporarily. The mobile application 208 may facilitate access to the insurance card image 216. Accordingly, the mobile application 208 may be configured to receive and process user input requesting access to and display of the insurance card image 216. In particular, the mobile application 208 may include a user input element (such as a button) that, when selected by the user, causes the mobile application to, e.g., retrieve the insurance card image 216 from the data store 210 and display the insurance card image at the display device 212. The display device 212 may thus display the insurance card image 216 and present the insurance information 218 to the user. In order to protect the privacy of the insurance information 218 in the insurance card image 216, the mobile application 208, in some example implementations, may request that an insurance customer agree the insurance card image may be displayed in a non-confidential setting. The mobile application, in this example, may record such an agreement from the insurance customer and permit the display of the insurance card image 216. If, however, the insurance customer has not agreed that the insurance card image 216 may be displayed in a non-confidential setting, the mobile application 208 may prevent the display of the insurance card image 216.

In addition, the mobile application 208 may request that the insurance customer provide access credentials (e.g., a username and password) to log into the mobile application and display the insurance card image 216. The mobile device may authenticate the insurance customer by comparing access credentials received from the customer to stored access credentials. If the access credential received from the insurance customer may the stored access credentials, the mobile application 208 may permit the display of the insurance card image 216. If, however, the access credentials received from the insurance customer do not match the stored access credentials, then the mobile application 208 may prevent the display of the insurance card image. The access credentials may be stored locally at the mobile device 202 or remotely at an authentication server in signal communication with the mobile application 208. In some example implementations, the mobile application 208 may only request that the insurance customer login once such that, after the insurance customer logs in, the insurance card image 216 is available for display whenever the insurance customer launches the mobile application and requests display of the insurance card image. In this way, the mobile application may permit presentation of the insurance card image 216 after a successful login attempt. In some example implementations, the insurance card image 216 may be available for presentation subsequent to the successful login attempt without an additional login attempt.

In some example implementations, selection of the user input element at the mobile application 208 may, e.g., cause the mobile application to request the insurance card image 216 from the insurance system 204. In particular, the mobile application 208 may transmit an insurance card image request 220 to the insurance system 204 via the network 206. In response to receipt of the insurance card image request 220, the insurance system 204 may retrieve the insurance card image 216 stored at the insurance system and transmit the requested insurance card image 222 back to the mobile device. The insurance card image request 220 may include, e.g., information that uniquely identifies the insurance customer and allows the insurance system to lookup the insurance card image 216 associated with the customer. In some example implementations, the insurance card image request 220 may be associated with one or more security-related features to ensure that only the insurance customer receives the requested insurance card image 222. Security features may include, e.g., a password, a personal identification number (PIN), and other security-related features. These security-related features may also be selectively employed when responding to requests to display an insurance card image 216 at the display device 212 of the mobile device 202.

The mobile application 208 may also, in some example implementations, generate and transmit to the insurance system 204 an insurance display message 224 in response to the display of the insurance card image 216 at the mobile device. An insurance display message 224 informs the insurance system 204 that the insurance card image 216 has been displayed at the mobile device 202. Insurance customers are likely to display their insurance information following an incident (e.g., a vehicle collision) that may ultimately result in the filing of an insurance claim. By receiving notifications of access to the insurance card image 216, the insurance system 204 may determine that the insurance customer has potentially been involved in an incident that may result in an insurance claim. Accordingly, the insurance system 204 may proactively initiate follow-up communications from the insurance company to the insurance customer in order to confirm or dismiss the potential insurance claim. Such proactive communications from the insurance company advantageously eliminate the need for the customer to contact the insurance company thereby improving customer service and the customer experience.

The insurance display message 224 may include insurance display information describing the circumstances of the request. For example, the mobile application 208 may query a timing device (not shown) at the mobile device 202 to obtain the date and time the user requested display of the insurance card image 216. The insurance display message 224 may thus include date and time information. The mobile application 208 may also query the GPS unit 214 for location information (e.g., latitude and longitude coordinates) that indicates the current geographic location of the mobile device 202. Accordingly, the insurance display message 224 may include location information as well. The insurance display message 224 may include additional and alternative types of information. As discussed in further detail below, the insurance system 204 may utilize the information included in the insurance display message 224 in order to identify parties that were involved in an incident. It will be appreciated that an insurance card image request 220 may likewise include date and time information as well as location information as described above.

Referring now to the insurance system 204 in FIG. 2, an insurance company may implement the insurance system to maintain insurance information for its customers and provide insurance card images as described above. Accordingly, the insurance system 204 may include various modules that facilitate providing insurance card images 216 to the mobile devices 202 of insurance customers. The insurance system 204 may also include various modules that facilitate responding to insurance card image requests 220 and insurance display messages 224. The insurance system 204, in this example, includes: an image generator 226 that generates insurance card images 216 based on the insurance information of insurance customers; an input handler 228 that processes input received from mobile devices 202 (e.g., the insurance card image requests 220 and insurance display messages 224); and an distributor 230 that distributes the insurance card images 216 and new insurance card images 232 to the mobile device 202.

The insurance system 204, in this example, also includes a data store 234 that stores various types of insurance-related information. As shown by way of example in FIG. 2, the data store 234 stores customer information 236 for the insurance customers of the insurance company. The customer information 236 may, for example, include: information 238 relating to one or more drivers insured by the insurance company, e.g., the name, age, driver's license number, address, and contact information of a driver; information 240 relating to the vehicles associated with the insurance customer, e.g., the make, model, year, and color of a vehicle; and information 242 relating to the insurance policies associated with the customer, e.g., the insurance provider name, insurance provider contact information, insurance policy number, effective dates, and vehicles insured under the insurance policy. It will be appreciated that the customer information 236 may include additional or alternative information relating to the insurance customer, a vehicle associated with the insurance customer, or an insurance policy associated with the insurance customer. The insurance card image 216 may include some or all of this example driver information 236.

The data store 234 may include a database management system (DBMS) that facilitates storage and retrieval of information from the data store. Any data store and DBMS suitable for providing insurance-related services may be selectively employed. Moreover, it will be appreciated that the data store 234 may comprise multiple interconnected data stores. For example, the insurance system 204 may comprise an insurance customer data store that stores information relating to insurance customers, an insurance policy data store that stores information relating to insurance policies, and a vehicle telematics data store that stores vehicle telematics data received from the vehicles of insurance customers.

The image generator 226 may query the data store 234 for the driver information 236 associated with an insurance customer and generate the insurance card image 216 using the deriver information. The image generator 226 may create the insurance card image 216 such that the insurance card image includes at least a portion of the driver information 236. Any image file format suitable for displaying the driver information 236 may be selectively employed. Example image file formats that may be selectively employed include PNG, BMP, JPG, GIF, SVG, and other image file formats. It will be appreciated that the insurance card image 216 may also be included in a file capable of display image or graphic data. Example file formats capable of displaying image or graphic data include DOC, PDF, PS, and other compound file formats. Once the image generator 226 creates the insurance card image 216, the image generator 226 may store the insurance card image at the data store 234. The insurance system 204 may also provide the insurance card image 216 to the mobile device 202 for storage or display. Whenever the customer information 236 is updated, the image generator 226 may generate a new insurance card image 232 that includes the updated customer information. The image generator 226 may store the new insurance card image 232 at the data store 234 such that the new insurance card image replaces an existing insurance card image 216 for the insurance customer. The insurance system 204 may then provide the new insurance card image 232 to the mobile device 202 for storage or display. In this way, the insurance card image 216 stored at the data store 234 of the insurance system 204 and at the data store 210 of the mobile device 202 may include the most up-to-date information 236 associated with the insurance customer.

In particular, the distributor 230 of the insurance system 204 may distribute the new insurance card images 232 to the mobile devices 202. Once the image generator 226 creates a new insurance card image 232, the image generator may notify the distributor 230 that the new insurance card image 232 is available to be sent to the mobile device 202. The notification to the distributor 230 may identify the mobile device 202 (e.g., via mobile phone number) that should receive the new insurance card image 232. The distributor 230 may transfer, transmit, or otherwise provide the insurance card images 216 and 232 to a mobile device 202. As described above, the distributor 230 may provide an insurance card image 216 to the mobile device 202 in response to receipt of a request 220 from the mobile device. In some example implementations, the distributor 230 may push the new insurance card image 232 to the mobile device 202, e.g., using a push notification message. The push notification message may include as its payload the new insurance card image 232 having the most up-to-date insurance information for the insurance customer. In response to receipt of the push notification message, the mobile device 202 may extract the new insurance card image 232 and store the new insurance card image in its data store 210 such that the new insurance card image replaces an existing insurance card image 216 stored at the data store. In this way, the insurance system 204 may advantageously push new insurance card images 232 whenever new having the most up-to-date insurance information to the mobile devices 202.

In other example implementations, the distributor 230 may simply provide a push notification message that informs the insurance customer a new insurance card image 232 is available from the insurance system 204. In response to receipt of the push notification message, the mobile application 208 at the mobile device 202 may present the push notification message to the user and allow the user to accept or deny the new insurance card image 232. If the user selects to receive the new insurance card image 232, the mobile application 208 may submit a request to the insurance system 204 for the new insurance card image, and the insurance system may deliver the new insurance card image to the mobile device in response to receipt of the request. In this alternative example, it will be appreciated that the mobile device 202 pulls the new insurance card image 232 from the insurance system 204 in contrast to pushing the new insurance card image from the insurance system to the mobile device as described above.

As also noted above, the mobile application 208 may retrieve an insurance card image 216 from the insurance system 204 rather than the data store 210 of the mobile device 202. The mobile application 208 may retrieve an insurance card image 216 from the insurance system 204 by submitting an insurance card image request 220 as described above. The input handler 228 of the insurance system 204 may receive and process insurance card image requests 220. In response to receipt of the request, the input handler 228 may extract information from the request 220 that identifies the mobile device 202 requesting the insurance card image (e.g., a customer number or mobile phone number). The input handler 228 may thus retrieve the insurance card image 216 for the insurance customer associated with the mobile device 202 and transmit the requested insurance card image 222 back to the mobile device. In this regard, the mobile device 202 may likewise pull the insurance card image 216 from the insurance system 204. The mobile application 208 may be configured to automatically request the insurance card image 216 from the insurance system 204 on a periodic basis (e.g., once a month, once a quarter, or once a year). The mobile application 208 may additionally or alternatively be configured to request the insurance card image 216 from the insurance system in response to receipt of user input at the mobile application. The mobile application 208 may also periodically query the insurance system 204 to determine whether a new insurance card image 216 is available. If the insurance system 204 indicates that a new insurance card image 216 is available, then the mobile application 208 may request the new insurance card image from the insurance system, and the insurance system may provide the new insurance card image in response to receipt of the request. It will be appreciated that, in some example implementations, the mobile application 208 may query the insurance system 204 each time the mobile application launches in order to determine whether a new insurance card image 216 is available.

Once the insurance card image 216 is stored or received at the mobile device 202, the user may utilize the mobile application 208 to display the insurance card image at the display device 212 for presentation of the insurance information 218. As noted above, the mobile application 208 may transmit insurance display messages 224 to the insurance system when a user accesses the insurance card image 216 at the mobile device. The input handler 228 may also process the insurance display messages 224 received at the insurance system 204. Upon receipt of an insurance display message 224, the input handler 228 may create an insurance display record 244 corresponding to the insurance display message 224. The input handler 228 may extract the insurance display information (e.g., the date, time, and location information) from the insurance display message 224 and store the insurance display information in the insurance display record 244.

It will be appreciated that the input handler 228 may receive and process other types of inbound communications and input received at the insurance system 204. It will also be appreciated that the input handler 228 may comprise multiple modules such as, for example, an insurance card image request handler, an insurance display message handler, and a communication gateway that directs inbound communications to the appropriate module for processing.

By storing insurance display records 244 that respectively correspond to the insurance display messages 224, the insurance system 204 may be able to compare the insurance display records and identify insurance display records that have similar or matching insurance display information. In this way, the insurance system 204 may identify insurance customers that may have been involved in the same incident. For example, if the insurance system 204 receives an insurance display message from two insurance customers indicating that each customer requested display of their insurance card image 216 on the same day, at a similar time, from a similar location, then the insurance system 204 may determine that the insurance customers were involved in the same incident. Accordingly, the insurance system 204 may automatically associate those insurance customers with each other as well as with any insurance claims that result from the incident.

In this regard, the insurance system 204 may include an insurance display analyzer 246 to process and analyze the insurance display records 244. Upon receipt of a new insurance display message 224 and creation of a new insurance display record 244, the insurance display analyzer 246 may, for example, query the data store for any existing insurance display records having matching (or at least similar) date, time, and location information. The insurance display analyzer 246, in this example, may query the data store for existing insurance display records that match the date of the new insurance display record. The insurance display analyzer 246 may then determine whether any of the access request messages occurring on the same day occurred within a predetermined time period (e.g., 0-20 minutes) of each other and within a predetermined distance (e.g., 0-100 feet of each other). If so, then the insurance display analyzer 246 may determine that the insurance customers respectively associated with the insurance display messages are associated with one another. Accordingly, the insurance display analyzer may associate the matching insurance display records with each other such that the insurance customers associated with those records are also associated with each other. In this way, an insurance system may utilize the insurance display analyzer 246 and insurance display records 244 to automatically identify insurance customers that may be related for an insurance claim. It will be appreciated that the insurance display analyzer 246 may submit one or more queries to the data store 234 specifying one or more of the criteria set forth above.

Additionally or alternatively, the insurance display analyzer 246 may utilize a telematics analyzer 247 to analyze telematics information 248 in order to determine whether a vehicle associated with the insurance customer has been involved in an incident such as a vehicle collision. The telematics analyzer 247 may also be utilized to identify the respective parties involved in an incident based on the telematics information. The data store 234 of the insurance system 204 may store telematics information 248 received from the vehicles of insurance customers. Vehicle telematics data refers to technical information relating to the status or operation of a vehicle. Vehicle telematics data may include, for example, directional acceleration and deceleration (e.g., forward/backward, left/right up/down), change in directional acceleration, vehicle speed or velocity, engine throttle and RPM (revolutions per minute), steering input, engagement of various vehicle subsystems (e.g., stability control systems, antilock brake systems), and the like. Those skilled in the art will appreciate that a vehicle telematics device may be configured to collect and record data relating to the operation and status of the vehicle. The vehicle telematics device may then provide the vehicle telematics data to, e.g., an insurance system for storage and analysis. Information describing the collection, processing, and analysis of telematics information is described in U.S. patent application Ser. No. 13/791,338 filed on Mar. 8, 2013 and entitled "Automated Accident Detection, Fault Attribution, and claims Processing" as well as U.S. patent application Ser. No. 13/791,287 filed on Mar. 8, 2013 and entitled "Encouraging Safe Driving Using a Remote Vehicle Starter and Personalized Insurance Rates" each of which are assigned to Allstate Insurance Company of Northbrook, Ill. and each of which are incorporated by reference in this disclosure in their entirety.

The telematics information 248 may include vehicle telematics data corresponding to the operation of the vehicles of the insurance customers. The telematics analyzer 247 may analyze the telematics information 248 to identify telematics events that may be indicative of an incident involving the vehicle (e.g., a vehicle collision). Examples of telematics events that may correlate with vehicle incidents include a hard-braking event, a sudden stop event, and a hard turning event. The telematics information 248 may also identify the vehicle that provided the telematics information. Accordingly, the insurance customer associated with the vehicle that provided the telematics information 248 may be determined. The telematics information 248 may also indicate the date, time, and location at which these events occurred. It will thus be appreciated that the insurance display analyzer 246 may determine whether a telematics event has a date, time, and location that matches (or is at least similar to) the date, time, and location of an insurance display message. In particular, the insurance display analyzer 246 may determine whether a telematics event occurred on the same day, within a predetermined time period (e.g., 0-20 minutes), and within a predetermined distance (e.g., 0-100 feet) of the mobile device at which the customer display the insurance card image 216. If so, then the insurance display analyzer 246 may conclude that the vehicle associated with the insurance customer was potentially involved in an incident that may result in an insurance claim.

In response to the determination that the insurance customer was potentially involved in an incident, the insurance system 204 may initiate various responses including, notifying an insurance agent so that the insurance agent may contact the insurance customer, automatically creating a placeholder insurance claim and populating the insurance claim with basic customer information, and locating additional parties involved in the incident. It will be appreciated that the insurance display analyzer 246 may identify additional parties involved in the incident based on additional insurance display messages 224 received at the insurance system 204 as well as additional telematics information 248 collected at the insurance system. For example, the insurance display analyzer 246 may query the data store 234 to determine whether any additional insurance display messages 224 were received on the same day, around the same time, and near the same geographic location as the insurance display message associated with the incident. The insurance display analyzer 246 may also utilize the telematics analyzer 247 to determine if any additional telematics incidents occurred on the same day, around the same time, and near the same geographic location.

In some example implementations, the insurance system 204 may also be in signal communication with a third-party insurance system 250 via the network 206. The third-party insurance system 250 may also collect and store telematics information for its insurance customers. If the insurance display analyzer 246 of the insurance system 204 does not identify vehicle telematics data 248 corresponding to an insurance display message 224, then the insurance system 204 may submit a query to the third-party insurance system 250 to determine whether the third-party insurance system has telematics data corresponding to the insurance display message 224. Accordingly, the query to the third-party insurance system 250 may include the time, date, and location of the access request message 224. If the third-party insurance system 250 indicates that it has located telematics data that matches (or is at least similar to) the information associated with the insurance display message 224, then the insurance system 204 may determine that a third-party insurance customer was also involved in the incident. The insurance system 204 may request, and the third-party insurance system 250 may provide, information relating to the third-party insurance customer such as, e.g., contact information, insurance information, and other information relating to the third-party insurance customer. This information may be helpful, for example, to resolve any insurance claims arising from the incident. It will be appreciated that multiple insurance companies operating respective insurance systems may be interconnected to advantageously identify parties to potential incidents in this fashion.

In response to receipt of an insurance display message 224 or in response to a determination that one or more insurance customers may have been involved in an incident, the insurance display analyzer 246 may initiate various responses from the insurance system 204. As one example, the insurance system 204 may notify an insurance agent of the insurance display message such that the insurance agent may follow-up with the insurance customer. In this way, insurance agents may proactively contact customers regarding potential incidents that may need an insurance claim to be filed. In some example implementations, the response from the insurance system 204 may be automated. The insurance system 204 may, for example, transmit instructions to the mobile application 208 at the mobile device 202 of the insurance customer instructing the mobile application to gather additional information regarding the potential incident. In response to the instructions received from the insurance system 204, the mobile application may ask the insurance customer a series of questions, e.g.: "Were you involved in a vehicle collision?"; "Do you need medical assistance?"; "Would you like to file an insurance claim?"; "Do you need vehicle towing or rental service?" Along with the instructions, the insurance system 204 may provide a set of questions to the mobile application 208 to present to the insurance customer. The insurance customer may thus provide answers to the questions presented, and the mobile application 208 may transmit a set of answers back to the insurance system 204, which may in turn provide the set of answers to an insurance agent. The insurance system 204 may also initiate various responses automatically based on the answers provided by the insurance customer (e.g., automatically creating an insurance claim).

The insurance system 204 may respond based on the answers received from the insurance customer at the mobile application 208. For example, the insurance system 204 may notify an insurance agent of the incident, and the insurance agent may follow-up with the insurance customer via a phone call to carry out the claims process. The insurance system 204 may also notify emergency response authorities of the incident or provide information regarding nearby vehicle towing or rental services based on the geographic location of the insurance customer. In response to receipt of an insurance display message, the insurance system 204 may also automatically create a placeholder insurance claim. The insurance system 204 may populate the placeholder insurance claim with basic customer information. In this way, the placeholder insurance claim is available for the insurance agent to escalate to a confirmed insurance claim if the customer confirms an incident occurred. The insurance agent may also dismiss the placeholder insurance claim if the customer indicates an incident did not occur or that the customer does not want to file an insurance claim. In this way, the insurance system 204 may advantageously automate aspects of filing insurance claims in response to receipt of insurance display messages received from the mobile application 208 at the mobile device 202 of the insurance customer.

Figure 3:
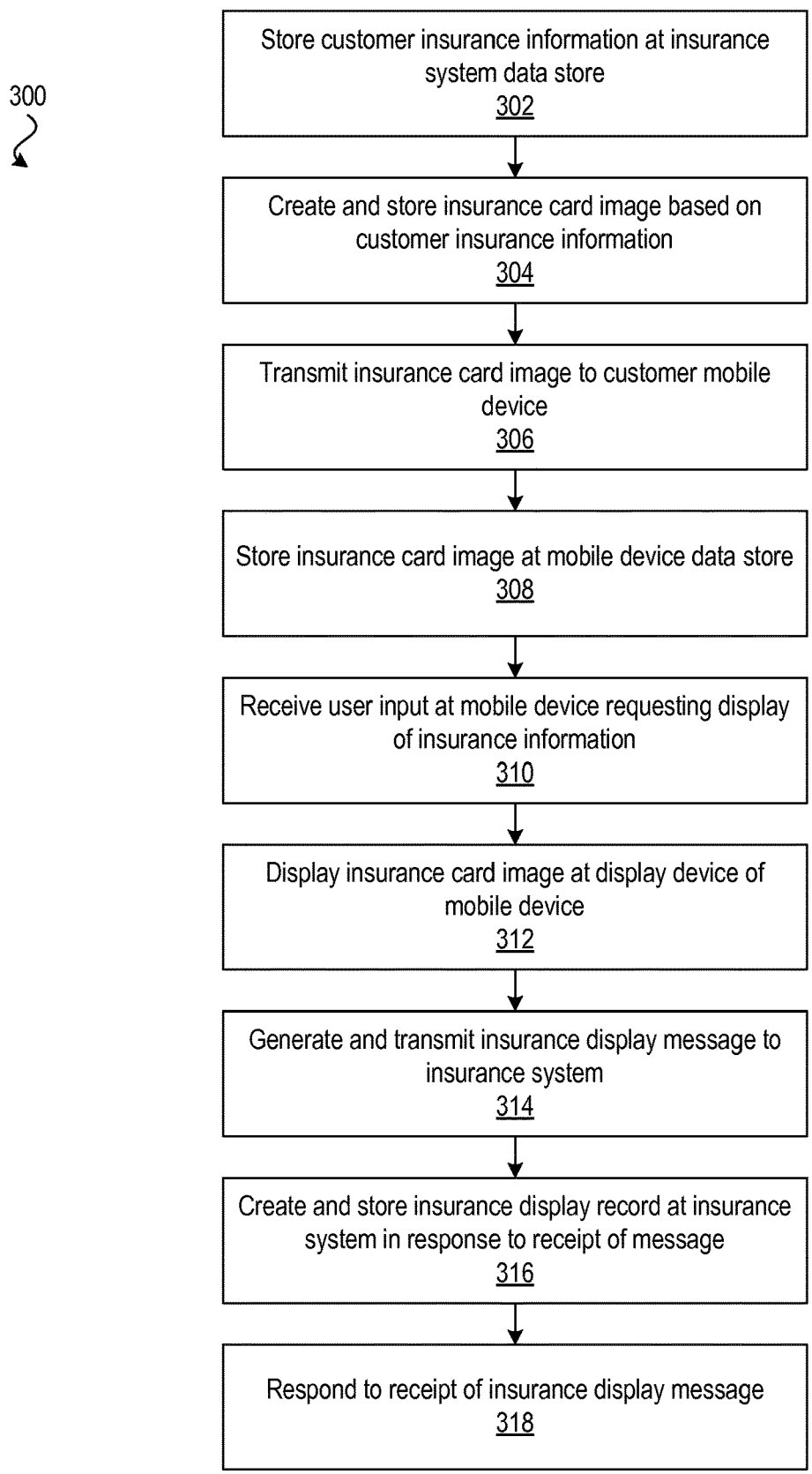
FIG. 3 is a flowchart of example method steps for accessing current insurance information at a mobile device.

Referring now to FIG. 3, a flowchart 300 of example method steps for accessing current insurance information at a mobile device is shown. First, an insurance company may store at a data store of an insurance system the insurance information associated with an insurance customer (block 302). An image generator at the insurance system may then create at least one insurance card image based on the insurance information associated with the insurance customer (block 304). The insurance system may transmit the insurance card image to a mobile device associated with the insurance customer (block 306). The mobile device may receive the insurance card image from the insurance system and store the insurance card image at a data store of the mobile device (block 308). As described above, a mobile application configured to facilitate various insurance-related tasks may be installed at the mobile device. The mobile application may thus manage the receipt and storage of the insurance card image at the mobile device.

An insurance customer may then launch the mobile application and provide input (e.g., via an interface button) requesting display of the insurance card image (block 310). The mobile application may then retrieve the insurance card image from the data store of the mobile device and present the insurance card image at the display device of the mobile device (block 312). In addition to displaying the insurance card image, the mobile application may also generate an insurance display message and transmit the insurance display message to the insurance system (block 314). As described above, the insurance display message may include the time, date, and location at which the insurance customer requested display of the insurance card. Upon receipt of the insurance display message at the insurance system, an input handler may create an insurance display record corresponding to the insurance display message and store the insurance display record at a data store of the insurance system (block 316). The insurance display record may likewise include the time, date, and location at which the insurance customer requested display of the insurance card image. Also in response to receipt of the insurance display message, the insurance system 204 may initiate one or more responses. As described above, responses may include, e.g., notifying an insurance agent so that the insurance agent may follow-up with the insurance customer, instructing the mobile application at the mobile device to pose a series of questions to the insurance customer, and automatically creating a placeholder insurance claim.

In FIG. 400, a flowchart 400 of example method steps for replacing insurance information stored at a mobile device with new insurance information is shown. As described above, a mobile device may store at its data store an insurance card image (block 402). An insurance card image currently stored at the mobile device may be referred to as the current insurance card image. The insurance customer may request display of the current insurance card image via a mobile application (block 404) and the mobile application may present the insurance card image at a display device of the mobile device (block 406).

Figure 4:
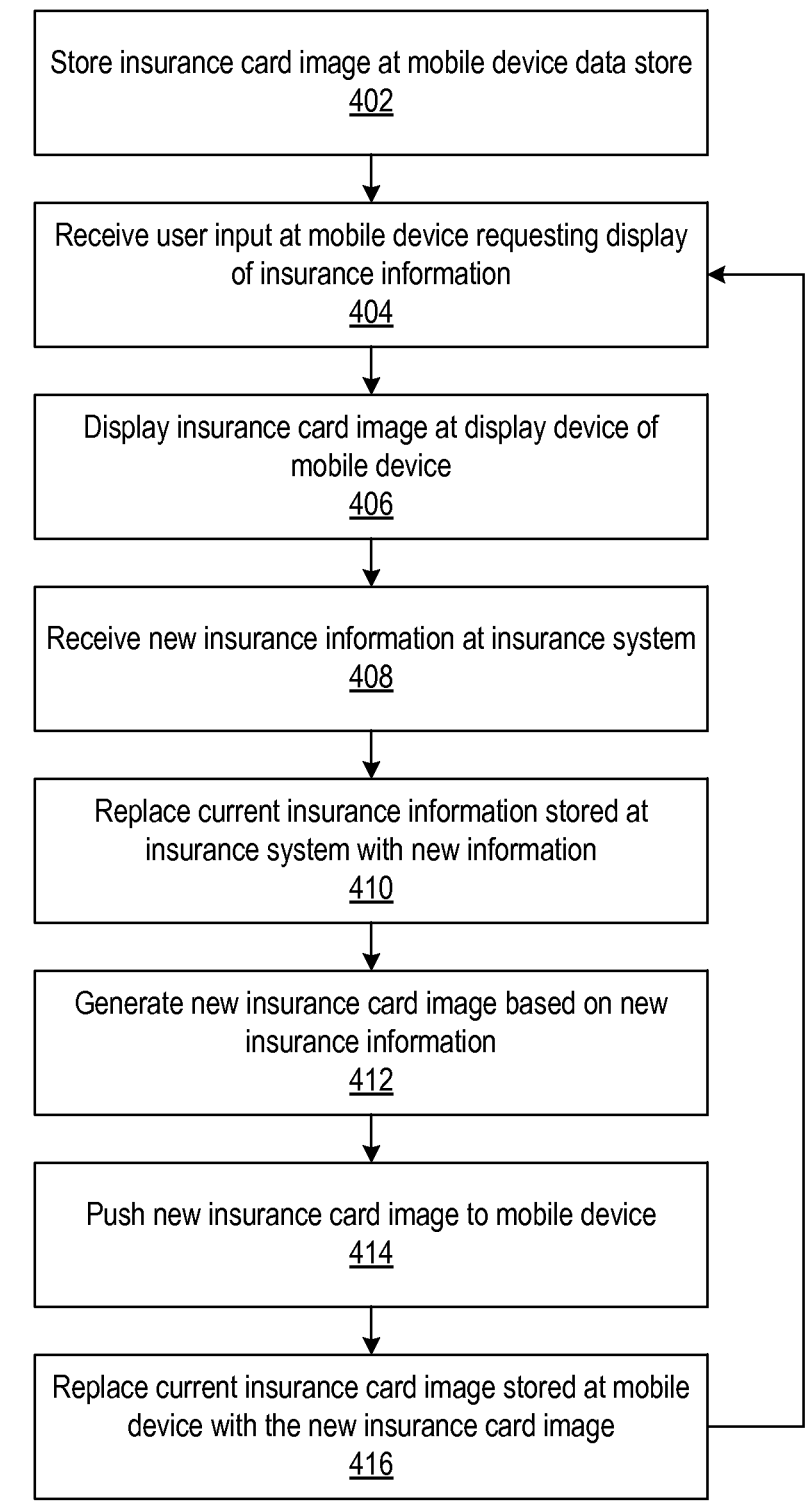
FIG. 4 is a flowchart of example method steps for replacing insurance information stored at a mobile device with new insurance information.

The insurance information associated with the insurance customer and included in the insurance card image may be stored at a data store of an insurance system maintained by an insurance company. This insurance information may similarly be referred to as current insurance information. The insurance company may receive new insurance information associated with the insurance customer (block 408) and replace the current insurance information for the insurance customer with the new insurance information (block 410). An image generator at the insurance system may generate a new insurance card image for the insurance customer based on the new insurance information (block 412). The insurance system may push the new insurance card image to the mobile device (block 414), e.g., via a push notification message. Having received the new insurance card image, the current insurance card image stored at the mobile device may be replaced with the new insurance card image (block 416). As shown in FIG. 4, steps 404-406 may be repeated to display the new insurance card image at the mobile device. As also shown in FIG. 4, steps 408-416 may be repeated to create and store subsequent insurance card images as the insurance information subsequently changes for the insurance customer.

Figure 5:
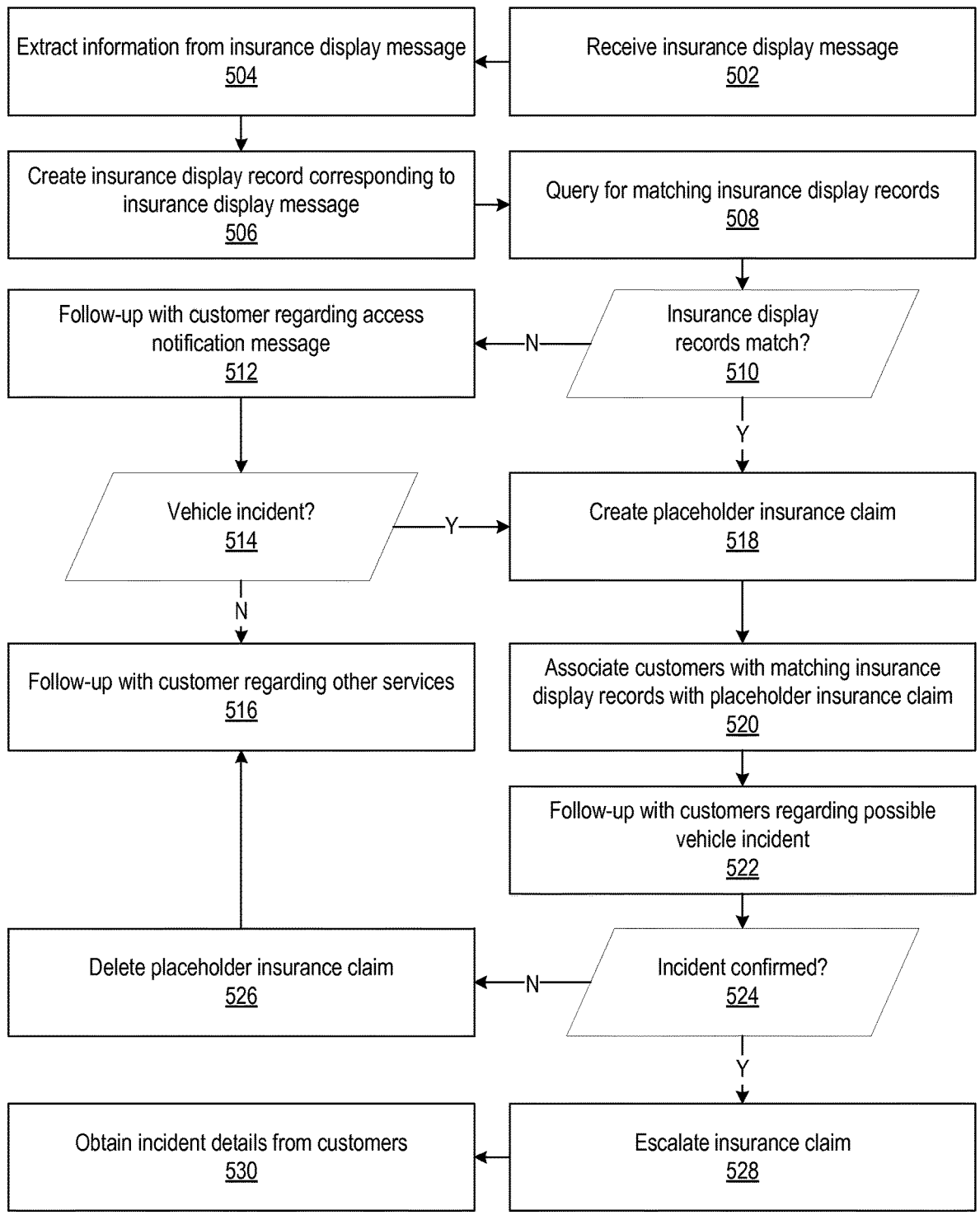
FIG. 5 is a flowchart of example method steps for responding to an indication that insurance information stored at a mobile device was accessed.

FIG. 5 is a flowchart 500 of example method steps for responding to an indication that insurance information stored at a mobile device was accessed. A mobile application that provides insurance-related features may be installed at a mobile device. The mobile application may provide an insurance display message to an insurance system when an insurance customer requests display of an insurance card image stored at the mobile device. Upon receipt of the insurance display message (block 502), the insurance system may extract information from the insurance display message (block 504). The information may include, e.g., the time, date, and location the insurance customer requested display of the insurance card image. The insurance system may then create and store an insurance display record corresponding to the insurance display message (block 506) as described above. An insurance display analyzer of the insurance system may then query the data store for insurance display records that match—or are at least similar to—the recently received insurance display message (block 508). As described above, the insurance display analyzer may query for insurance display records having a matching or similar date, time, and location.

If the insurance display analyzer does not locate matching or similar insurance display records (block 510:N), then the insurance system may initiate follow-up communications with the insurance customer regarding the insurance display message (block 512). The follow-up communications may be through a series of questions presented by the mobile application as described above. The answers to the questions may indicate the reason the insurance customer requested display of the insurance card image. For example, the insurance customer may have requested display of the insurance card image following a vehicle collision, following a traffic stop, or simply to check coverage information or effective dates. If the insurance customer indicates that a vehicle incident did not occur (block 514:N), then the insurance system may follow-up with the insurance customer regarding other insurance-related services (block 516), e.g., renewing an insurance policy, modifying insurance coverage, recommending tow services, recommending vehicle rental services, and other insurance-related services.

If, however, the insurance customer indicates a vehicle incident did occur (block 514:Y) or the insurance display analyzer determines an incident likely occurred by locating matching insurance display records (block 510:Y), then the insurance system may create a placeholder insurance claim (block 518). The insurance system may associate with the placeholder insurance claim the customers associated with the matching insurance display records (block 520). As described above, the insurance system may also populate the placeholder insurance claim with basic information such as, e.g., the contact information for the insurance customers. The insurance system may then notify an insurance agent who may follow-up with the insurance customers regarding the potential incident (block 522). If an insurance customer indicates that an incident did not occur (block 524:N), then the insurance agent may delete the placeholder insurance claim (block 526) and follow-up regarding any other insurance-related services available to the insurance customer (block 516). If the insurance customer confirms the incident (block 524:Y), then the insurance agent may escalate the placeholder insurance claim to a confirmed insurance claim (block 528) and obtain the incident details from the insurance customer (block 530) to complete the claims process. It will thus be appreciated that the insurance system may advantageously enable an insurance company to detect when insurance customers request display of their insurance information on the insurance card image, proactively follow-up with the insurance customers to provide various insurance services, and automatically prepare items such as insurance claims for potential claim filings.

Figure 6:
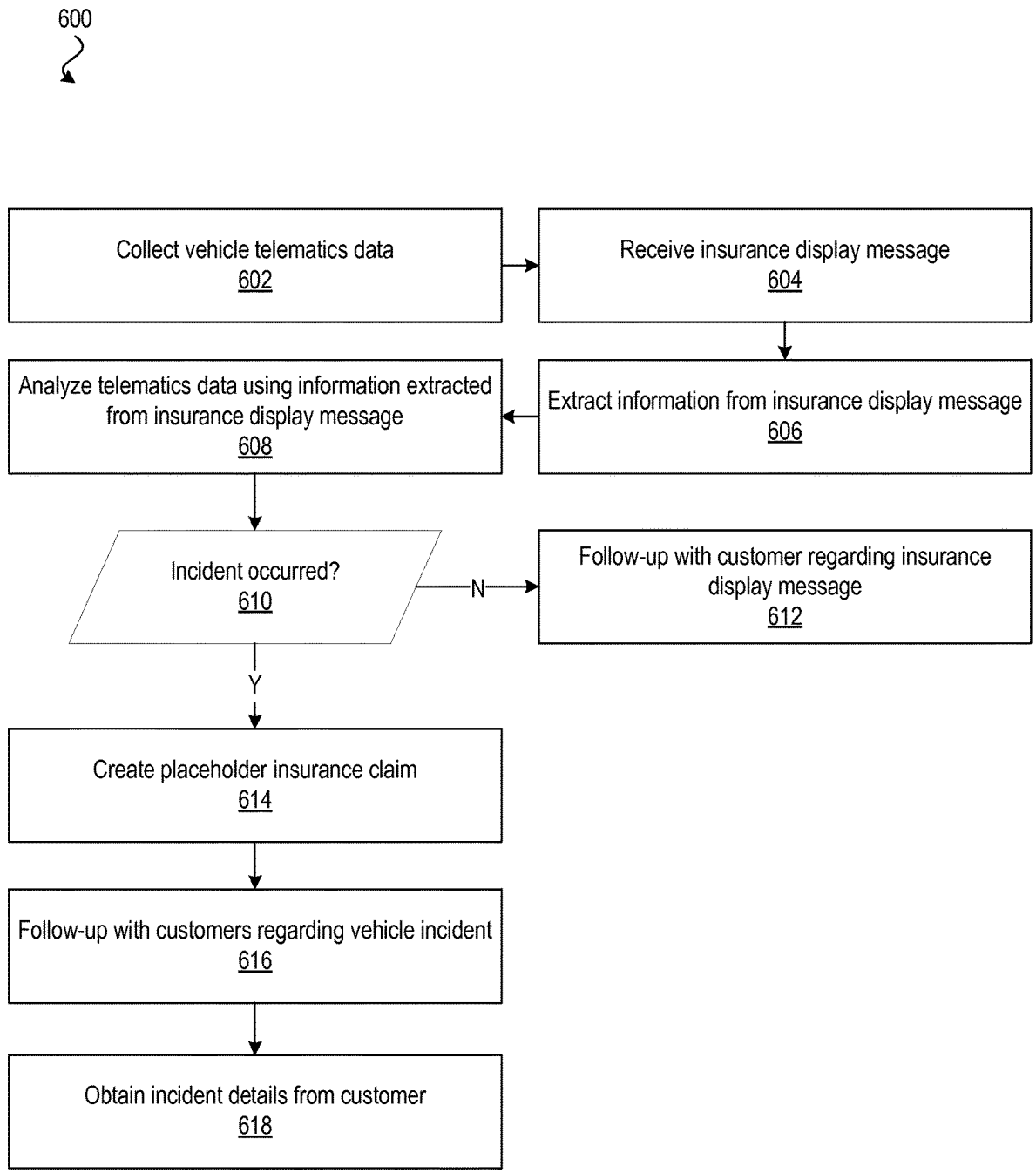
FIG. 6 is another flowchart of example method steps for responding to an indication that insurance information stored at a mobile device was accessed.

FIG. 6 is also a flowchart 600 of example method steps for responding to an indication that insurance information stored at a mobile device was accessed. As noted above, an insurance company may collect and store telematics data (block 602) from the vehicles of customers insured by the insurance company. The insurance system may receive an insurance display message (block 604) when an insurance customer requests display of an insurance card image at a mobile device. The insurance system may extract information from the insurance display message (block 606), e.g., time, date, and location information. An telematics analyzer at the insurance system may analyze the collected telematics data using the information extracted from the insurance display message (block 608). For example, the telematics analyzer may analyze the telematics data to determine whether the vehicle experienced an event that may indicate an incident involving the vehicle has occurred, e.g., a hard braking event, a sudden stop event, or a hard turn event. In particular, the telematics analyzer may determine whether one of these types of events occurred at or around the same time, date, and location as the insurance display message.

If the telematics analyzer does not identify an event at or around the same time, date, and location as the insurance display message, then the insurance system may determine that an incident involving the vehicle did not likely occur (block 610:N). In response to the determination that the insurance display message did not likely follow a vehicle incident, the insurance system may initiate a follow-up with the insurance customer to determine whether the insurance customer has need of any insurance-related services (block 612). The follow-up communications may be through an insurance agent or a mobile application installed at a mobile device of the insurance customer as described above.

If, however, the telematics analyzer does identify an event at or around the same time, date, and location as the insurance display message, then the insurance system may determine that an incident involving the vehicle did likely occur (block 610:Y). Accordingly, the insurance system may initiate various responses upon determining that the insurance display message likely followed an incident involving the vehicle. As described above, the insurance system may automatically create and populate a placeholder insurance claim (block 614), follow-up with the insurance customer regarding the incident (block 616), and obtain additional details from the customer regarding the incident (block 618).

Figure 7A:
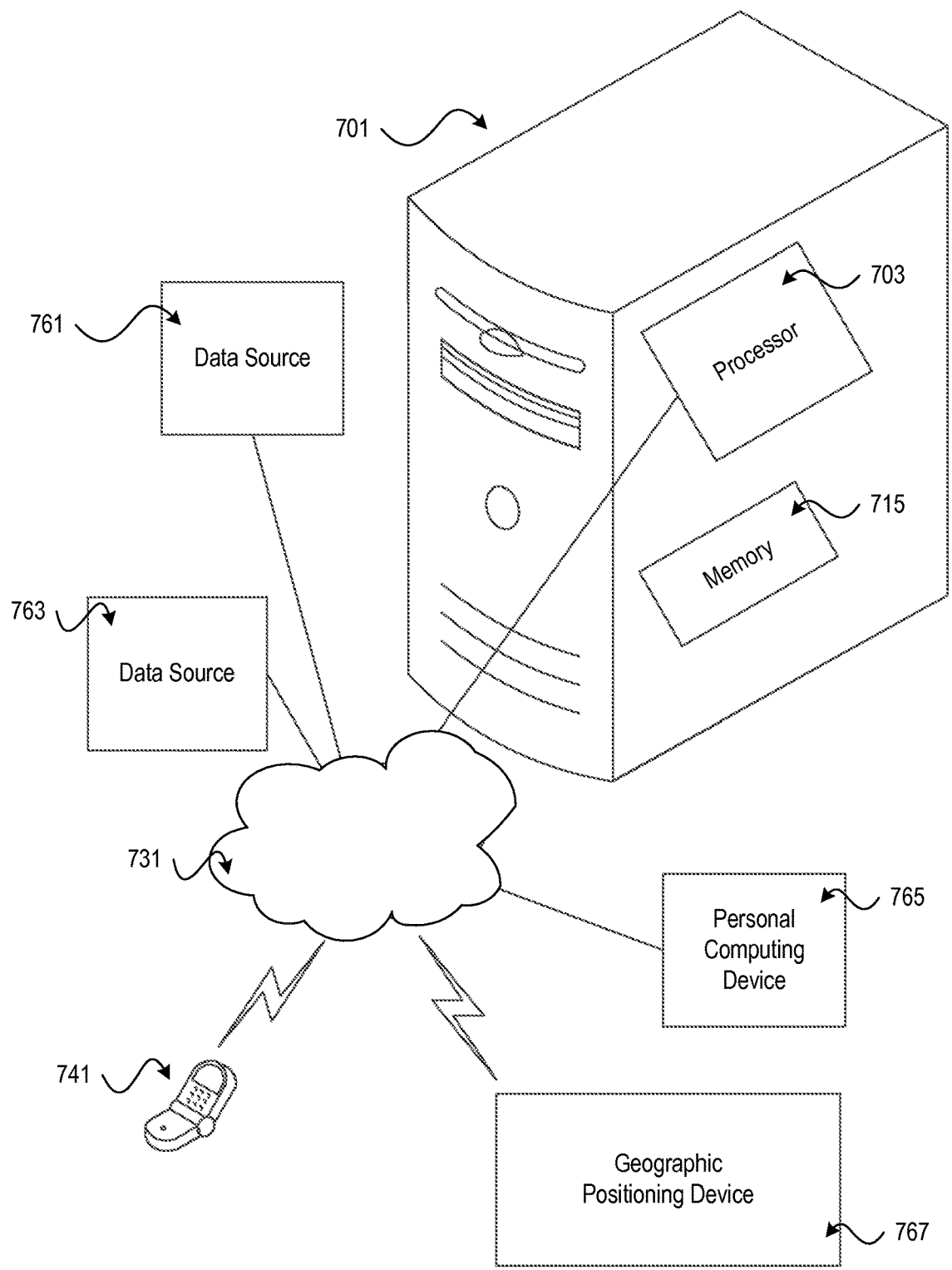
FIG. 7A is an example of an implementation of a suitable operating environment in which various aspects of the disclosure may be implemented.

Referring to FIG. 7A, an example of an implementation of a suitable operating environment in which various aspects of the disclosure may be implemented is shown. The operating environment is only one example of a suitable operating environment and is not intended to suggest any limitation as to the scope of use or functionality of the disclosure. The operating environment may be comprised of one or more data sources 761, 763 in communication with a computing device 701. The computing device 701 may use information communicated from the data sources 761, 763 to generate values that may be stored in a database format. In one embodiment, the computing device 701 may be a high-end server computer with one or more processors 703 and one or more memories 715 for storing and maintaining the values generated. The memories 715 storing and maintaining the values generated need not be physically located in the computing device 701. Rather, the memories (e.g., ROM 707, RAM 705, flash memory, hard drive memory, RAID memory, and the like) may be located in a remote data store (e.g., memory storage area 227) physically located outside the computing device 701, but in communication with the computing device 701.

A personal computing device 765 (e.g., a personal computer, tablet PC, handheld computing device, personal digital assistant, mobile device, etc.) may communicate with the computing device 701. Similarly, a geographic positioning device 767 (e.g., a global positioning system (GPS), geographic information system (GIS), satellite navigation system, mobile device, other location tracking device, and the like) may communicate with the computing device 701. The communication between the computing device 701 and the other devices 765, 767 may be through wired or wireless communication networks or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 701 and other devices (e.g., devices 765, 767) may be connected to one or more of the networks via twisted pair wires, coaxial cable, fiber optics, radio waves or other media. The term "network" as used herein and depicted in the drawings should be broadly interpreted to include not only systems in which devices or data sources are coupled together via one or more communication paths, but also stand-alone devices that may be coupled, from time to time, to such systems that have storage capability.

In another embodiment in accordance with aspects of the disclosure, a geographic positioning device 767 may operate in a stand-alone manner by locally storing some of the database of values stored in the memories 715 of the computing device 701. For example, a geographic positioning device 767 (e.g., a GPS in an automobile) may be comprised of a processor, memory, input devices 768, and output devices 769 (e.g., keypad, display screen, speaker, and the like). The memory may be comprised of a non-volatile memory that stores a database of values. Therefore, the geographic positioning device 767 need not communicate, in one example, with a computing device 701 located at a remote location. Rather, the geographic positioning device 767 may behave in a stand-alone manner and use its processor to perform particular steps disclosed herein. If desired, the geographic positioning device 767 may be refreshed with an updated database of values after a period of time.

In yet another embodiment in accordance with aspects of the disclosure, a personal computing device 765 may operate in a stand-alone manner by locally storing some of the database of values stored in the memory of the computing device. For example, a personal computing device 765 may be comprised of a processor, memory, input device (e.g., keypad, CD-ROM drive, DVD drive, etc.), and output device (e.g., display screen, printer, speaker, etc.). The memory may be comprised of CD-ROM media. Therefore, the personal computing device 765 may use the input device to read the contents of the CD-ROM media. Rather, the personal computing device 765 may behave in a stand-alone manner and use its processor to perform particular steps disclosed herein. If desired, the personal computing device may be provided with an updated database of values (e.g., in the form of updated CD-ROM media) after a period of time.

The data sources 761, 763 may provide information to the computing device 701. In one embodiment in accordance with aspects of the disclosure, a data source may be a computer which contains memory storing data and is configured to provide information to the computing device 701. Some examples of providers of data sources in accordance with aspects of the disclosure include, but are not limited to, insurance companies, third-party insurance data providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of the disclosure, access to the information in the data sources 761, 763 may be restricted to only authorized computing devices 701 and for only permissible purposes. For example, access to the data sources may be restricted to only those persons or entities that have signed an agreement (e.g., an electronic agreement) acknowledging their responsibilities with regard to the use and security to be accorded this information.

The computing device 701 may use the information from the data sources 761, 763 to generate values that may be used to provide insurance card images and respond to messages indicating display of the insurance card image. Some examples of the information that the data sources may provide to the computing device 701 include, but are not limited to, accident information, geographic information, and other types of information useful to provide insurance card images and other insurance-related services.

Figure 7B:
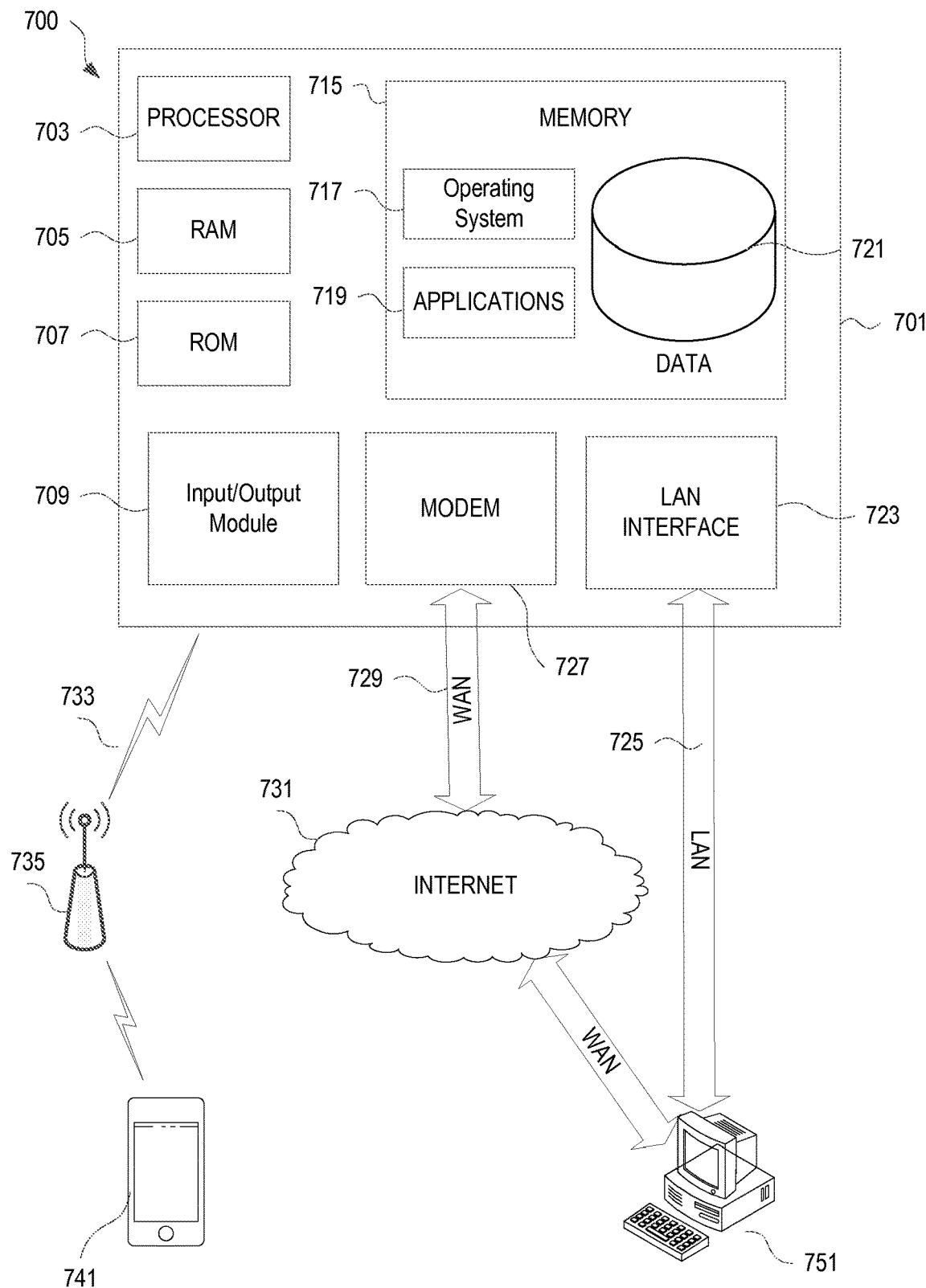
FIG. 7B is a block diagram of a system that may be used according to one or more example embodiments of the disclosure.
Figure 7A:
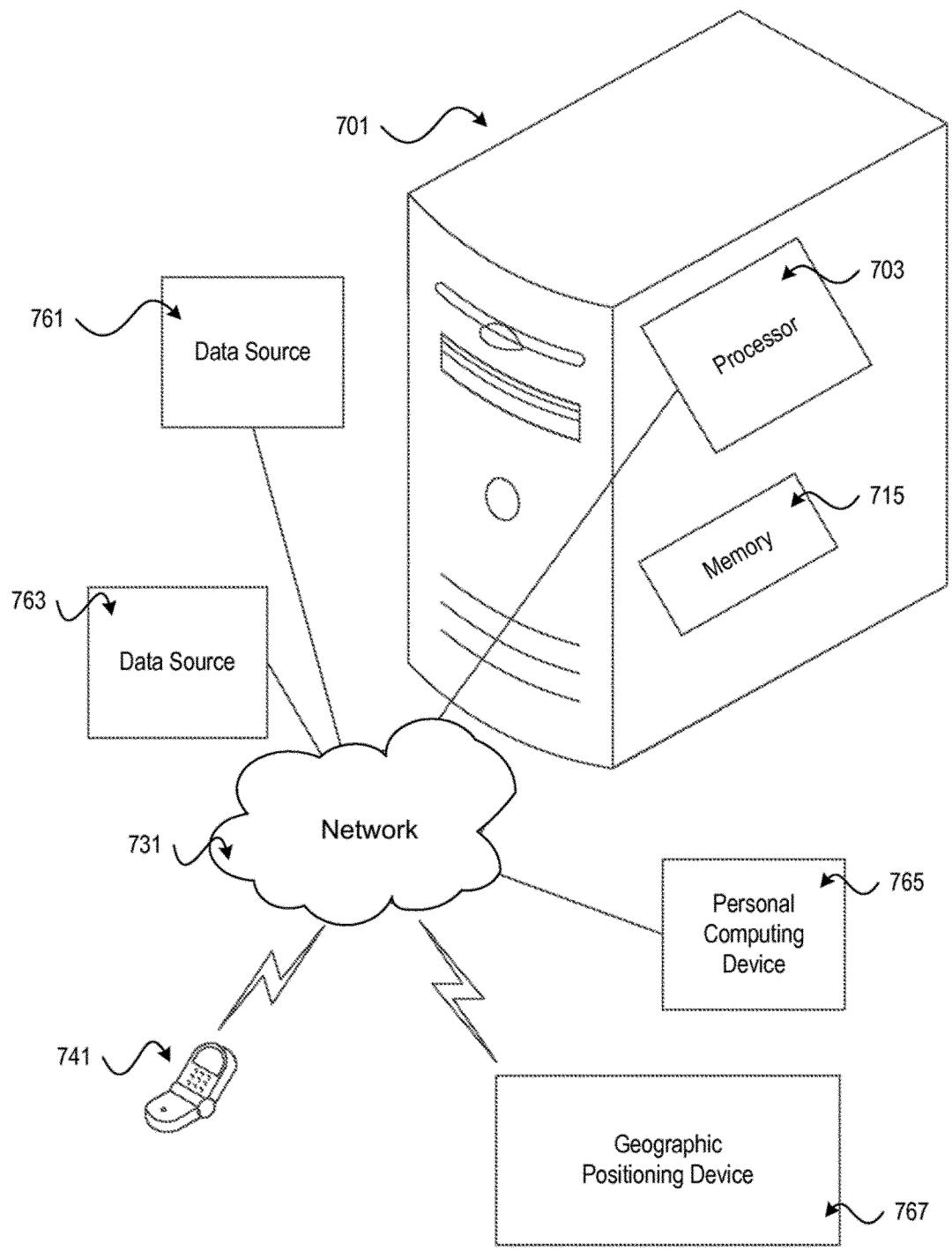

FIG. 7B illustrates a block diagram of a computing device (or system) 701 in the communication system 700 that may be used according to one or more illustrative embodiments of the disclosure. The device 701 may have a processor 703 for controlling overall operation of the device 701 and its associated components, including RAM 705, ROM 707, input/output (I/O) module 709, and memory 715. The computing device 701, along with one or more additional devices (e.g., terminals 741, 751) may correspond to any of multiple systems or devices, such as a system for maintaining current insurance information at a mobile device (FIG. 2), configured as described herein for providing insurance card images and responding to message indicating display of the insurance card image.

I/O module 709 may include a microphone, keypad, touch screen, and/or stylus through which a user of the computing device 701 may provide input, and may also include one or more of a speaker for providing audio output and a video display device for providing textual, audiovisual or graphical output. Software may be stored within memory 715 or storage to provide instructions to processor 703 for enabling device 701 to perform various functions. For example, memory 715 may store software used by the device 701, such as an operating system 717, application programs 719, and an associated internal database 721. Processor 703 and its associated components may allow the system to execute a series of computer-readable instructions to, e.g., generate an insurance card image, push the insurance card image to a mobile device, receive and response to insurance card image requests, and receive and respond to insurance display messages.

The system may operate in a networked environment supporting connections to one or more remote computers, such as terminals 741 and 751. The terminals 741 and 751 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the system 701. The network connections may include a local area network (LAN) 725 and a wide area network (WAN) 729, and a wireless telecommunications network 733, but may also include other networks. When used in a LAN networking environment, the system may be connected to the LAN 725 through a network interface or adapter 723. When used in a WAN networking environment, the system 701 may include a modem 727 or other means for establishing communications over the WAN 729, such as network 731 (e.g., the Internet). When used in a wireless telecommunications network 733, the system 701 may include one or more transceivers, digital signal processors, and additional circuitry and software for communicating with wireless computing devices 741 (e.g., mobile phones, vehicle telematics devices) via one or more network devices 735 (e.g., base transceiver stations) in the wireless network 733.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and system components described herein may be configured to communicate using any of these network protocols or technologies.

Additionally, one or more application programs 719 used by the system may include computer executable instructions (e.g., image generation programs) for providing insurance card images, responding to insurance display messages, and performing other related functions as described herein.

While the disclosure has been described with respect to specific examples including presently illustrative modes of carrying out the disclosure, a person having ordinary skill in the art, after review of the entirety disclosed herein, will appreciate that there are numerous variations and permutations of the above-described systems and techniques that fall within the spirit and scope of the disclosure.

What is claimed is:

1. A method of maintaining up-to-date insurance information at a mobile device comprising:
    obtaining, by an insurance system, insurance information associated with a first insurance customer;
    generating, by the insurance system, an insurance card image based on the insurance information;
    establishing, by the insurance system, a connection with a first mobile device associated with the first insurance customer, wherein the insurance system and the first mobile device are communicatively coupled over a network;
    transmitting, to the first mobile device and by the insurance system, the insurance card image, wherein receipt of the insurance card image at the first mobile device causes the first mobile device to store the insurance card image in a data store of the first mobile device; and
    in response to receiving an indication of a display of the insurance card image at the first mobile device in accordance with a user request for the display of the insurance card image:
        receiving, by the insurance system and from the first mobile device, a first message generated by the first mobile device indicating a time and a date at which the user request for display of the insurance card image was received at the first mobile device, and a geographic location of the first mobile device when the user request for display of the insurance card image was received at the first mobile device;
        creating and storing, by the insurance system and in a data store of the insurance system, a first record indicating the time, the date, and the geographic location;
        receiving, by the insurance system and from a first vehicle associated with the first insurance customer, telematics information of the first vehicle indicating a time, a date, and a geographical location at which an incident involving the first vehicle occurred;
        comparing, by the insurance system, the time, the date, and the geographic location indicated in the first record to the time, the date, and the geographic location indicated in the telematics information;
        based on a determination that the time, the date, and the geographic location indicated in the first record substantially matches the time, the date, and the geographic location indicated in the telematics information, automatically generating, by the insurance system, an insurance claim;
        analyzing, by the insurance system, the telematics information; and
        determining, by the insurance system and based on incident event data detected in the telematics information, that the incident involving the first vehicle has occurred wherein the incident event data includes data indicating a hard braking event, data indicating a sudden stop event, or data indicating a hard turn event,
    wherein the determination that the time and the date indicated in the first record substantially matches the time and the date indicated in the telematics information further comprises determining, by the insurance system and based on the comparison, that the user request for display of the insurance card image was received following the incident involving the first vehicle, and
    wherein automatically generating the insurance claim comprises:
        automatically populating, by the insurance system, the insurance claim with the insurance information associated with the first insurance customer and associating, by the insurance system, the insurance claim with the first record.

2. The method of claim 1, further comprising:
    receiving, by the insurance system and from the first mobile device, a request for the insurance card image; and
    transmitting, by the insurance system the insurance card image to the first mobile device in response to receipt of the request.

3. The method of claim 1, wherein the insurance card image is a current insurance card image and further comprising:
    receiving, by the insurance system, new insurance information associated with the first insurance customer;
    generating, by the insurance system, a new insurance card image based on the new insurance information; and
    transmitting, by the insurance system and to the first mobile device, the new insurance card image, wherein receipt of the new insurance card image at the first mobile device causes the first mobile device to replace the current insurance card image stored at the first mobile device with the new insurance card image.

4. The method of claim 3, wherein transmitting the new insurance card image to the first mobile device comprises automatically pushing the new insurance card image to the first mobile device in a push notification.

5. The method of claim 1, further comprising:
    comparing, by the insurance system, the first record to a second record stored in the data store of the insurance system, the second record being received from a second mobile device associated with a second insurance customer; and
    responsive to a determination that the time, the date, and the geographic location indicated in the first record substantially matches a second time, a second date, and a second geographic location indicated in the second record;
    automatically populating, by the insurance system, the insurance claim with insurance information associated with the second insurance customer; and
    associating, by the insurance system, the insurance claim with the second record.

6. An apparatus for maintaining up-to-date insurance information at a mobile device, the apparatus comprising:
one or more processors;
a data store that stores insurance information associated with an insurance customer; and memory storing computer-readable instructions that, when executed by one of the processors, cause the apparatus to:
generate a first insurance card image based on insurance information associated with a first insurance customer and retrieved from the data store of the apparatus;
transmit the first insurance card image to a first mobile device associated with the first insurance customer, wherein receipt of the first insurance card image at the first mobile device causes the first mobile device to store the first insurance card image in a data store of the first mobile device; and
in response to receiving an indication of a display of the first insurance card image at the first mobile device in accordance with a user request for the display of the first insurance card image:
receive, from the first mobile device, a first message generated by the first mobile device indicating a time and a date at which the user request for display of the first insurance card image was received at the first mobile device, and a geographic location of the first mobile device when the user request for display of the first insurance card image was received at the first mobile device;
create and store a first record indicating the time, the date, and the geographic location, the first record being stored in the data store of the apparatus,
receive, from a first vehicle associated with the first insurance customer, telematics information of the first vehicle indicating a time, a date, and a geographical location at which an incident involving the first vehicle occurred;
compare the time, the date, and the geographic location indicated in the first record to the time, the date, and the geographic location indicated in the telematics information;
based on a determination that the time, the date, and the geographic location indicated in the first record substantially matches the time, the date, and the geographic location indicated in the telematics information, automatically generate an insurance claim,
analyze the telematics information; and
determine, based on incident event data detected in the telematics information, that the incident involving the first vehicle has occurred, wherein the incident event data includes data indicating a hard braking event, data indicating a sudden stop event, or data indicating a hard turn event,
wherein the determination that the time and the date indicated in the first record substantially matches the time and the date indicated in the telematics information further comprises determining, based on the comparison, that the user request for display of the first insurance card image was received following the incident involving the first vehicle.

7. The apparatus of claim 6, wherein the instructions, when executed by one of the processors, further cause the apparatus to:
notify, in response to receipt of the first message, an insurance agent that the first insurance card image was requested for display and displayed at the first mobile device.

8. The apparatus of claim 6, wherein the instructions, when executed by one of the processors, further cause the apparatus to:
provide one or more questions to the first mobile device, wherein the one or more questions request that the first insurance customer provide information regarding one or more reasons the first insurance card image was requested for display and displayed at the mobile device; and
provide one or more answers received from the first mobile device to an insurance agent.

9. The apparatus of claim 6, wherein the instructions, when executed by one of the processors, further cause the apparatus to:
generate a new insurance card image based on new insurance information associated with the first insurance customer; and
transmit the new insurance card image to the mobile device.

10. The apparatus of claim 6 wherein the instructions, when executed by one or more of the processors, further cause the apparatus to:
compare the first record to a second record stored in the data store of the apparatus, the second record being received from a second mobile device associated with a second insurance customer; and
based on a determination that the time, the date, and the geographic location indicated in the first record substantially matches a second time, a second date, and a second geographic location indicated in the second record;
automatically populate the insurance claim with the insurance information associated with the first insurance customer and insurance information associated with the second insurance customer; and
associate the insurance claim with the first record and the second record.

11. The apparatus of claim 6, wherein the instructions, when executed by one or more of the processors, further cause the apparatus to:
automatically populate the insurance claim with the insurance information associated with the first insurance customer; and
associate the insurance claim with the first record.

12. The apparatus of claim 6, wherein the instructions, when executed by one or more of the processors, further cause the apparatus to:
receive second telematics information from a second vehicle associated with a second insurance customer;
determine that at least a portion of the second telematics information received from the second vehicle substantially matches at least a portion of the telematics information received from the first vehicle; and
automatically populate the insurance claim with insurance information associated with the second insurance customer.

13. A non-transitory, computer-readable medium having instructions stored thereon that, when executed, cause a mobile device to perform steps for maintaining up-to-date insurance information, the steps comprising:
receiving, at the mobile device and from an insurance system, an insurance card image; storing the insurance card image at a data store of the mobile device;

receiving, at the mobile device, input corresponding to a request to present the insurance card image;

responsive to receiving the input corresponding to the request to present the insurance card image, retrieving the insurance card image from the data store of the mobile device and presenting the insurance card image at a display of the mobile device; and responsive to receiving the input corresponding to the request to present the insurance card image and presenting the insurance card image:

querying a timing device of the mobile device to obtain a date on which the request to present the insurance card image was received;

querying the timing device of the mobile device to obtain a time at which the request to present the insurance card image was received;

querying a Global Positioning System (GPS) unit of the mobile device to obtain a geographic location of the mobile device when the request to present the insurance card image was received;

generating and transmitting a message to the insurance system, wherein the message indicates the date on which the request to present the insurance card image was received, the time at which the request to present the insurance card image was received, and the geographic location of the mobile device when the request to present the insurance card image was received; and in response to receipt of the message by the insurance system, and based on a determination, by the insurance system, that data detected in telematics information received from a vehicle, associated with an owner of the mobile device, indicates that an incident involving the vehicle occurred prior to the request to present the insurance card image, receiving, from the insurance system, one or more questions requesting information regarding one or more reasons for the request to present the insurance card image.

14. The non-transitory, computer-readable medium of claim 13, wherein the insurance card image is a current insurance card image, and wherein the steps further comprise:

receiving a new insurance card image from the insurance system; and storing the new insurance card image at the data store such that the new insurance card image replaces the current insurance card image stored at the data store.

15. The non-transitory, computer-readable medium of claim 14, wherein the steps further comprise:

querying the insurance system to determine whether the new insurance card image is available from the insurance system; and requesting the new insurance card image from the insurance system responsive to an indication that the new insurance card image is available from the insurance system.

16. The non-transitory, computer-readable medium of claim 13, wherein the steps further comprise:

permitting a first presentation of the insurance card image following a successful login attempt, wherein the insurance card image is available for a second presentation subsequent to the successful login attempt without an additional login attempt.

17. The method of claim 5, further comprising:

in response to a display of a second insurance card image at the second mobile device in accordance with a second user request for the display of the second insurance card image:

receiving, by the insurance system and from the second mobile device, a second message generated by the second mobile device indicating the second time and the second date at which the second user request for display of the second insurance card image was received at the second mobile device, and the geographic location of the second mobile device when the second user request for display of the second insurance card image was received at the second mobile device; and creating, by the insurance system, the second record indicating the second time, the second date, and the second geographic location.

18. The apparatus of claim 10, wherein the instructions, when executed by one of the processors, further cause the apparatus to:

in response to a display of a second insurance card image at the second mobile device in accordance with a second user request for the display of the second insurance card image:

receive, from the second mobile device, a second message generated by the second mobile device indicating the second time and the second date at which the second user request for display of the second insurance card image was received at the second mobile device, and the geographic location of the second mobile device when the second user request for display of the second insurance card image was received at the second mobile device; and create the second record indicating the second time, the second date, and the second geographic location.

\* \* \* \* \*

UNITED STATES PATENT AND TRADEMARK OFFICE
CERTIFICATE OF CORRECTION

PATENT NO. : 10,572,943 B1  
APPLICATION NO. : 14/022552  
DATED : February 25, 2020  
INVENTOR(S) : Tye et al.

Page 1 of 3

It is certified that error appears in the above-identified patent and that said Letters Patent is hereby corrected as shown below:

On the Title Page

Page 3, Column 2, item (56) Other Publications, Line 14:
Delete "Technolgy" and insert --Technology--

In the Drawings

Please replace Fig. 7A with Fig. 7A as shown on the attached page.

In the Specification

Column 11, Detailed Description, Line 12:
Delete "left/right" and insert --left/right,--

In the Claims

Column 20, Line 8:
In Claim 1, after "occurred", insert --,--

Column 20, Lines 25-26:
In Claim 1, delete "customer and" and insert --customer; and¶--

Column 20, Line 62:
In Claim 5, delete "record;" and insert --record:--

Column 21, Line 5:
In Claim 6, after "and", insert --¶--

Column 21, Line 49:
In Claim 6, delete "claim," and insert --claim;--

Signed and Sealed this  
Eighteenth Day of May, 2021

Drew Hirshfeld  
*Performing the Functions and Duties of the  
Under Secretary of Commerce for Intellectual Property and  
Director of the United States Patent and Trademark Office*

Column 22, Line 24:
In Claim 10, after "claim 6", insert --,--

Column 22, Line 35:
In Claim 10, delete "record;" and insert --record:--

Column 22, Line 66:
In Claim 13, after "image;", insert --¶--

Column 22, Line 67:
In Claim 13, after "device;", insert --¶--